(12) United States Patent  
Shi et al.

(10) Patent No.: US 11,036,968 B2  
(45) Date of Patent: Jun. 15, 2021

(54) METHOD AND APPARATUS FOR PATTERN RECOGNITION

(71) Applicant: ArcSoft Corporation Limited, Hangzhou (CN)

(72) Inventors: Lei Shi, Nanjing (CN); Renlin Pan, Nanjing (CN); Wei Zhang, Nanjing (CN); Shiwen Lv, Nanjing (CN)

(73) Assignee: ArcSoft Corporation Limited, Hangzhou (CN)

( * ) Notice: Subject to any disclaimer, the term of this patent is extended or adjusted under 35 U.S.C. 154(b) by 74 days.

(21) Appl. No.: 16/115,046

(22) Filed: Aug. 28, 2018

(65) Prior Publication Data

US 2020/0160037 A1     May 21, 2020

(51) Int. Cl.
| | |
|---|---|
| *G06K 9/00* | (2006.01) |
| *G06K 9/32* | (2006.01) |
| *G06K 9/62* | (2006.01) |

(52) U.S. Cl.
CPC ..... *G06K 9/00281* (2013.01); *G06K 9/00201* (2013.01); *G06K 9/00288* (2013.01); *G06K 9/3208* (2013.01); *G06K 9/6215* (2013.01)

(58) Field of Classification Search
CPC .......... H04M 1/72572; H04M 1/6505; H04M 1/72533; H04M 1/575; H04M 2242/15;
(Continued)

(56) References Cited

U.S. PATENT DOCUMENTS

| | | | | |
|---|---|---|---|---|
| 8,681,158 B1 * | 3/2014 | Sullivan | ............. | G06K 9/00315 345/473 |
| 2004/0070673 A1 * | 4/2004 | Nakamura | ............... | H04N 1/21 348/207.2 |

(Continued)

FOREIGN PATENT DOCUMENTS

| | | |
|---|---|---|
| CN | 103246875 A | 8/2013 |
| CN | 106909873 A | 6/2017 |

OTHER PUBLICATIONS

Gu, Yiran et al., "Study on 3D face pose recovery algorithm", Chinese Journal of Scientific Instrument, vol. 31, No. 10, Oct. 2010, pp. 2291-2295 (5 pages).

Office Action with English Translation and Search Report issued in corresponding Chinese Application No. 201710778500.1, dated May 8, 2020 (29 pages).

*Primary Examiner* — Nimesh Patel

(74) *Attorney, Agent, or Firm* — Osha Bergman Watanabe & Burton LLP

(57) ABSTRACT

A method and an apparatus for pattern recognition is provided in the present invention, applied to the field of artificial intelligence. The method includes: acquiring a two-dimensional image of a target object and a two-dimensional feature of the target object according to the two-dimensional image of the target object; and acquiring a three-dimensional image of the target object and a three-dimensional feature of the target object according to the three-dimensional image of the target object; identifying the target object according to the two-dimensional feature and the three-dimensional feature of the target object. The method can reduce restrictions on acquiring the image of the target object, for example, reduce the restrictions on the image of the target object in terms of postures, lighting, expressions, make-up and occlusion, thereby improving an accuracy of recognizing the target object and improving a recognition rate and reducing recognition time at the same time.

22 Claims, 5 Drawing Sheets

(58) Field of Classification Search
CPC ......... H04M 1/72569; H04M 2250/52; H04W
4/02; H04W 4/021; H04W 52/0251;
H04W 4/023; H04W 4/025; H04W 4/026;
H04W 4/029; H04W 4/18; H04W
72/1215; H04W 12/06; H04W 4/024;
B60W 2050/146; B60W 2550/308; B60W
2720/10; B60W 2750/308; B60W 30/16;
G06T 7/246; G06T 7/73; G06T 2200/04;
G06T 2207/10004; G06T 19/006; G06T
15/10; G06T 1/0007; G06T 2207/10012;
G06T 2207/10016; G06T 2207/30201;
G06T 2207/30204; G06T 3/0031; G06T
3/0056; G06T 5/006; G06T 7/55; G06T
7/74; G06T 15/205; H04N 13/128; H04N
13/30; H04N 1/00411; H04N 21/25841;
H04N 21/4312; H04N 13/20; H04N
5/23299; H04N 5/772; H04N 13/161;
H04N 1/32128; H04N 13/239; H04N
13/257; H04N 13/271; H04N 13/359;
H04N 2201/0084; H04N 2201/3247;
H04N 2201/3252; H04N 13/156; G06F
3/04815; G06F 2200/1637; G06F
2221/2111; G06F 3/0481; G06F
2203/04802; G06F 16/9537; G06F 16/29;
G06F 3/0346; G06F 16/583; G06F 3/012;
G06F 3/017; G06F 16/24578; G06K
9/00281; G06K 9/00201; G06K 9/00288;
G06K 9/3208; G06K 9/6215; G06K
9/6211; G06K 9/50; G06K 9/00221;
G06K 9/629; G06K 9/00268
See application file for complete search history.

(56) References Cited

U.S. PATENT DOCUMENTS

| | | | |
|---|---|---|---|
| 2004/0223049 A1* | 11/2004 | Taniguchi | G06F 3/1423 348/14.02 |
| 2011/0063419 A1* | 3/2011 | Lee | H04N 13/361 348/47 |
| 2012/0070096 A1* | 3/2012 | Oyama | G06T 5/003 382/254 |
| 2012/0188342 A1* | 7/2012 | Gervautz | G06T 7/246 348/46 |
| 2013/0076860 A1* | 3/2013 | Liu | G06T 15/205 348/46 |
| 2014/0101611 A1* | 4/2014 | Lang | G06F 21/32 715/813 |
| 2015/0300814 A1* | 10/2015 | Xu | G01B 11/026 348/142 |
| 2017/0039761 A1* | 2/2017 | Zhang | G06T 17/00 |
| 2017/0371230 A1* | 12/2017 | Ko | H04N 5/23245 |
| 2018/0129296 A1* | 5/2018 | Jiang | G06T 7/521 |
| 2018/0330466 A1* | 11/2018 | Basso | G06T 1/20 |
| 2019/0141312 A1* | 5/2019 | Swope | G06T 7/62 |

\* cited by examiner

METHOD AND APPARATUS FOR PATTERN RECOGNITION

TECHNICAL FIELD

The present invention relates to an artificial intelligence method and, in particular, to a method and an apparatus for pattern recognition.

BACKGROUND

Pattern recognition is a technology that studies automatic processing and interpretation of patterns using mathematical technique by a computer. We may generally refer to an environment and an object as "patterns". With the development of computer technologies, it is possible for human to study complex information processing processes. An important form of the information processing process is identification of the environment and the object by a living body. For human, the identification of optical information (which is obtained through visual organs) and acoustic information (which is obtained through auditory organs) is of significant importance. Where, the identification according to the optical information may include fingerprint identification, face recognition, and the like.

Where, face recognition refers to a biometric identification technology that performs identity identification using visual feature information of faces. Compared with other biometric technologies, the face recognition technology has the advantages of rich information, non-contact, simple and rapid acquisition manners, and friendly man-machine and the like. Therefore, the face recognition technology has wide application prospects in fields of authentication, access control systems, public safety and the like.

Recognition according to the optical information is mainly divided into two directions at present, which are two-dimensional image recognition and three-dimensional image recognition. Recognition based on two-dimensional images has higher requirements on two-dimensional images, for example has higher requirements on conditions such as postures, lighting conditions, make-up conditions and expressions and the like of a target object in two-dimensional images, thereby affecting an accuracy of recognition. Compared with the recognition based on two-dimensional images, the recognition based on three-dimensional images faces the problems of heavy calculation burden and a low recognition rate caused by complicated computation processes.

SUMMARY

A method and an apparatus for pattern recognition provided in the present invention can solve the problem that the recognition accuracy is not high due to relatively high requirements on an obtained image of the target object.

A first aspect of the present invention provides a method for pattern recognition, the method includes:

acquiring a two-dimensional image of a target object and acquiring a two-dimensional feature of the target object according to the two-dimensional image of the target object, and acquiring a three-dimensional image of the target object and acquiring a three-dimensional feature of the target object according to the three-dimensional image of the target object;

identifying the target object according to the two-dimensional feature and the three-dimensional feature of the target object.

According to the first aspect of the present invention, in a first possible implementation form of the first aspect, the three-dimensional image of the target object includes a three-dimensional curved surface of the target object, the three-dimensional feature of the target object includes at least one three-dimensional feature curve of the three-dimensional curved surface of the target object;

the at least one three-dimensional feature curve includes a curve where at least one plane intersects with the three-dimensional curved surface of the target object or a curve where a part of the plane intersects with the three-dimensional curved surface of the target object, or a set of points in the three-dimensional curved surface of the target object with a distance to the intersecting curve less than or equal to a first threshold, or, the at least one three-dimensional feature curve includes a curve where at least one curved surface intersects with the three-dimensional curved surface of the target object or a curve where a part of the curved surface intersects with the three-dimensional curved surface of the target object, or a set of points in the three-dimensional curved surface of the target object with a distance to the intersecting curve less than or equal to a first threshold.

According to the first possible implementation form of the first aspect of the present invention, in a second possible implementation form of the first aspect of the present invention, the three-dimensional feature of the target object is concentrated in a first region, the first region includes a partial region of the three-dimensional curved surface of the target object, and the at least one three-dimensional feature curve is located in the first region.

According to the first possible implementation form or the second possible implementation form of the first aspect of the present invention, in a third possible implementation form of the first aspect of the present invention, the at least one plane is perpendicular to a feature plane of the three-dimensional curved surface of the target object, and the feature plane of the three-dimensional curved surface of the target object includes a plane in which three feature points on the three-dimensional curved surface of the target object are located.

According to a third possible implementation form of the first aspect of the present invention, in a fourth possible implementation form of the first aspect of the present invention, the at least one plane intersects at a first straight line, and the first straight line is perpendicular to the feature plane of the three-dimensional curved surface of the target object.

According to any one of the first possible implementation form to the fourth possible implementation form of the first aspect of the present invention, in a fifth possible implementation form of the first aspect of the present invention, before acquiring the three-dimensional feature of the target object according to the three-dimensional image of the target object, the method further includes:

performing, under a three-dimensional coordinate system whose original point is a feature point on the three-dimensional curved surface of the target object, a pose adjustment to the three-dimensional curved surface of the target object, where the pose adjustment including at least one of the following:

performing a pose adjustment according to a normal vector of the feature plane of the three-dimensional curved surface of the target object; and selecting two feature points on the three-dimensional curved surface of the target object, and performing a pose adjustment according to the vector where the two feature points are located.

According to the fifth possible implementation form of the first aspect of the present invention, in a sixth possible implementation form of the first aspect of the present invention, the performing a pose adjustment according to a normal vector of the feature plane of the three-dimensional curved surface of the target object includes:

determining a rotation matrix $R_z$ for rotating the normal vector of the feature plane of the three-dimensional curved surface of the target object to a direction as same as a positive direction of a Z axis in the three-dimensional coordinate system, where an included angle between the normal vector and the positive direction of the Z axis is an acute angle, rotating the three-dimensional curved surface of the target object according to the rotation matrix $R_z$;

where the performing pose adjustment according to the vector where the two feature points are located includes:

determining a rotation matrix $R_x$ for rotating the vector where the two feature points are located to a direction as same as a positive direction of an X axis in the three-dimensional coordinate system, where an included angle between the vector where the two feature points are located and the positive direction of the X axis is an acute angle, rotating the three-dimensional curved surface of the target object according to the rotation matrix $R_x$.

According to any one of the first possible implementation form to the sixth possible implementation form of the first aspect of the present invention, in a seventh possible implementation form of the first aspect of the present invention, the method further includes: determining a distance between the at least one three-dimensional feature curve of the target object and at least one three-dimensional feature curve corresponding to at least one three-dimensional image in a set of three-dimensional images for objects, and determining a first weighted sum of the obtained at least one distance, where the first weighted sum represents a three-dimensional image similarity between the three-dimensional image of the target object and at least one three-dimensional image in the set of three-dimensional images for the objects.

According to the seventh possible implementation form of the first aspect of the present invention, in an eighth possible implementation form of the first aspect of the present invention, the acquiring the two-dimensional feature of the target object according to the two-dimensional image of the target object includes: acquiring the two-dimensional feature of the two-dimensional image of the target object and a two-dimensional feature of at least one two-dimensional image in a set of two-dimensional images for objects;

the method further includes:

determining a distance between the two-dimensional feature of the at least one two-dimensional image in the set of two-dimensional images for the objects and the two-dimensional feature of the two-dimensional image of the target object, and determining a second weighted sum of the at least one of the distance, where the second weighted sum represents a two-dimensional similarity between the two-dimensional image of the target object and at least one two-dimensional image in the set of two-dimensional images for the objects.

According to the eighth possible implementation form of the first aspect of the present invention, in a ninth possible implementation form of the first aspect of the present invention, the method further includes:

determining a third weighted sum of the two-dimensional similarity and the three-dimensional image similarity, where the third weighted sum represents a similarity between the target object and at least one object in a set of objects;

identifying the target object in the set of objects according to the similarity.

According to the first aspect of the present invention or any one of the first possible implementation form to the ninth possible implementation form of the first aspect of the present invention, in a tenth possible implementation form of the first aspect of the present invention, the target object includes a target face, and the three-dimensional image of target object includes a three-dimensional face curved surface of the target face;

the three-dimensional feature of the target object includes at least one three-dimensional face feature curve of the target face;

the at least one three-dimensional face feature curve of the target face plane includes a curve where at least one plane intersects with the three-dimensional face curved surface of the target face or a curve where a part of the plane intersects with the three-dimensional face curved surface of the target face, or a set of points in the three-dimensional face curved surface of the target face with a distance to the intersecting curve less than or equal to a first threshold; or, at least one three-dimensional face feature curve of the target face includes a curve where at least one curved surface intersects with the three-dimensional face curved surface of the target face or a curve where a part of the curved surface intersects with the three-dimensional face curved surface of the target face, or a set of points in the three-dimensional face curved surface of the target face with a distance to the intersecting curve less than or equal to a first threshold.

According to the tenth possible implementation form of the first aspect of the present invention, in an eleventh possible implementation form of the first aspect of the present invention, the three-dimensional face feature curve is located in upper half of the face including a tip point of a nose.

According to the tenth possible implementation form of the first aspect of the present invention or the eleventh possible implementation form of the first aspect of the present invention, in a twelfth possible implementation form of the first aspect of the present invention, the at least one plane is perpendicular to a face feature plane of the target face, the face feature plane of the target face includes a plane in which three of the following feature points are located, where the three points include: one point or two points of an inner corner point of a left eye, an outer corner point of the left eye, an inner corner point of a right eye, and an outer corner point of the right eye; at least one of a left corner point of a mouth, and a right corner point of the mouth; and a tip point of a nose.

According to the twelfth possible implementation form of the first aspect of the present invention, in a thirteenth possible implementation form of the first aspect of the present invention, the at least one plane intersects at the first straight line, the first straight line is perpendicular to the face feature plane of the target face, and the first straight line passes the tip point of the nose on the target face.

According to any one of the tenth possible implementation form of the first aspect of the present invention to the thirteenth possible implementation form of the first aspect of the present invention, in a fourteenth possible implementation form of the first aspect of the present invention, before acquiring the three-dimensional feature of the target object according to the three-dimensional image of the target object, the method further includes:

performing, under a three-dimensional coordinate system whose original point is a tip point of a nose on a target face, a pose adjustment to the three-dimensional face curved surface of the target face, where the pose adjustment including at least one of the following:

performing a pose adjustment according to a normal vector of the face feature plane of the target face; and performing a pose adjustment according to a vector which is determined according to a left corner point of a mouth and a right corner point of the mouth on the three-dimensional face curved surface of the target face.

According to the fourteenth possible implementation form of the first aspect of the present invention, in a fifteenth possible implementation form of the first aspect of the present invention, the performing a pose adjustment according to a normal vector of the face feature plane of the target face includes:

determining a rotation matrix $R_z$ for rotating the normal vector of the face feature plane of the target face to a direction as same as a positive direction of a Z axis in the three-dimensional coordinate system, where an included angle between the normal vector and the positive direction of the Z axis is an acute angle, rotating the three-dimensional face curved surface of the target face according to the rotation matrix $R_z$;

where performing a pose adjustment according to a vector which is determined according to a left corner point of a mouth and a right corner point of the mouth on the target face includes:

determining a rotation matrix $R_x$ for rotating the vector which is determined according to the left corner point of the mouth and the right corner point of the mouth on the target face to a direction as same as a positive direction of an X axis in the three-dimensional coordinate system, where an included angle between the determined vector and the positive direction of the X axis is an acute angle, rotating the three-dimensional face curved surface of the target face according to the rotation matrix $R_x$.

According to any one of the tenth possible implementation form of the first aspect of the present invention to the fifteenth possible implementation form of the first aspect of the present invention, in a sixteenth possible implementation form of the first aspect of the present invention, the method further includes: determining a distance between the at least one three-dimensional face feature curve of the target face and the at least one three-dimensional face feature curve corresponding to at least one face in a set of faces, and determining a first weighted sum of the obtained at least one distance, where the first weighted sum represents a three-dimensional face similarity between the target face and the at least one face in the set of faces.

According to the sixteenth possible implementation form of the first aspect of the present invention, in a seventeenth possible implementation form of the first aspect of the present invention, the acquiring the two-dimensional feature of the target object according to the two-dimensional image of the target object includes: acquiring a two-dimensional feature of the target face and a two-dimensional feature of at least one face in a set of faces using a convolutional neural network model;

the method further includes:

determining a distance between the two-dimensional feature of the at least one face in the set of faces and the two-dimensional feature of the target face, and determining a second weighted sum of at least one of the distance, where the second weighted sum represents a two-dimensional face similarity between the target face and at least one face in the set of faces.

According to the seventeenth possible implementation form of the first aspect of the present invention, in an eighteenth possible implementation form of the first aspect of the present invention, determining a third weighted sum of the two-dimensional face similarity of the target face and the three-dimensional face similarity of the target face, where the third weighted sum represents a similarity between the target face and at least one face in a set of faces; identifying the target face in the set of faces according to the similarity of the at least one face.

According to any one of the first possible implementation form of the first aspect of the present invention to the eighteenth possible implementation form of the first aspect of the present invention, in a nineteenth possible implementation form of the first aspect of the present invention, the included angle between two adjacent planes in the at least one plane is a first angle.

According to the nineteenth possible implementation form of the first aspect of the present invention, in a twentieth possible implementation form of the first aspect of the present invention, the first angle is 10 degrees.

A second aspect of the present invention provides an apparatus for pattern recognition, the apparatus includes an acquiring module and an identifying module, the acquiring module, configured to acquire a two-dimensional image of a target object and acquire a two-dimensional feature of the target object according to the two-dimensional image of the target object; and acquire a three-dimensional image of the target object and acquire a three-dimensional feature of the target object according to the three-dimensional image of the target object;

the identifying module, configured to identify the target object according to the two-dimensional feature and the three-dimensional feature of the target object obtained by the acquiring module.

According to the second aspect of the present invention, in the first possible implementation form of the second aspect, the three-dimensional image of the target object includes a three-dimensional curved surface of the target object, the three-dimensional feature of the target object includes at least one three-dimensional feature curve of the three-dimensional curved surface of the target object;

the at least one three-dimensional feature curve includes a curve where at least one plane intersects with the three-dimensional curved surface of the target object or a curve where a part of the plane intersects with the three-dimensional curved surface of the target object, or a set of points in the three-dimensional curved surface of the target object with a distance to the intersecting curve less than or equal to a first threshold, or, the at least one three-dimensional feature curve includes a curve where at least one curved surface intersects with the three-dimensional curved surface of the target object or a curve where a part of the curved surface intersects with the three-dimensional curved surface of the target object, or a set of points in the three-dimensional curved surface of the target object with a distance to the intersecting curve less than or equal to a first threshold.

According to the first possible implementation form of the second aspect of the present invention, in a second possible implementation form of the second aspect of the present invention, the three-dimensional feature of the target object is concentrated in a first region, the first region includes a partial region of the three-dimensional curved surface of the target object, and the at least one three-dimensional feature curve is located in the first region.

According to the first possible implementation form of the second aspect of the present invention or the second possible implementation form of the second aspect, in a third possible implementation form of the second aspect of the present invention, the at least one plane is perpendicular to a feature plane of the three-dimensional curved surface of the target object, and the feature plane of the three-dimensional curved surface of the target object includes a plane in which three feature points on the three-dimensional curved surface of the target object are located.

According to the third possible implementation form of the second aspect of the present invention, in a fourth possible implementation form of the second aspect of the present invention, the at least one plane intersects at a first straight line, and the first straight line is perpendicular to the feature plane of the three-dimensional curved surface of the target object.

According to any one of the first possible implementation form of the second aspect of the present invention to the fourth possible implementation form of the second aspect of the present invention, in a fifth possible implementation form of the second aspect of the present invention, the apparatus further includes a pose adjusting module, the pose adjusting module, configured to perform, under a three-dimensional coordinate system whose original point is a feature point on the three-dimensional curved surface of the target object, a pose adjustment before the acquiring module acquires the three-dimensional feature of the target object according to the three-dimensional image of the target object, and the pose adjusting module includes at least one of the following sub-modules: a first pose adjusting sub-module and a second pose adjusting sub-module;

the first pose adjusting sub-module, configured to perform a pose adjustment according to a normal vector of the feature plane of the three-dimensional curved surface of the target object; and the second pose adjusting sub-module, configured to select two feature points on the three-dimensional curved surface of the target object, and perform a pose adjustment according to the vector where the two feature points are located.

According to the fifth possible implementation form of the second aspect of the present invention, in a sixth possible implementation form of the second aspect of the present invention, the first pose adjusting sub-module is specifically configured to determine a rotation matrix $R_z$ for rotating the normal vector of the feature plane of the three-dimensional curved surface of the target object to a direction as same as a positive direction of a Z axis in the three-dimensional coordinate system, where an included angle between the normal vector and the positive direction of the Z axis is an acute angle, rotate the three-dimensional curved surface of the target object according to the rotation matrix $R_z$;

the second pose adjusting sub-module is specifically configured to determine a rotation matrix $R_x$ for rotating the vector where the two feature points are located to a direction as same as a positive direction of an X axis in the three-dimensional coordinate system, where an included angle between the vector where the two feature points are located and the positive direction of the X axis is an acute angle, rotate the three-dimensional curved surface of the target object according to the rotation matrix $R_x$.

According to any one of the first possible implementation form of the second aspect of the present invention to the sixth possible implementation form of the second aspect of the present invention, in a seventh possible implementation form of the second aspect of the present invention, the identifying module is specifically configured to determine a distance between the at least one three-dimensional feature curve of the target object and at least one three-dimensional feature curve corresponding to at least one three-dimensional image in a set of three-dimensional images for objects, and determine a first weighted sum of the obtained at least one distance, the first weighted sum represents a three-dimensional image similarity between the three-dimensional image of the target object and at least one three-dimensional image in the set of three-dimensional images for the objects.

According to the seventh possible implementation form of the second aspect of the present invention, in an eighth possible implementation form of the second aspect of the present invention, the acquiring module is specifically configured to acquire the two-dimensional feature of the two-dimensional image of the target object and two-dimensional feature of at least one two-dimensional image in a set of two-dimensional images for objects;

the identifying module is specifically configured to determine a distance between the two-dimensional feature of the at least one two-dimensional image in the set of two-dimensional images for the objects and the two-dimensional feature of the two-dimensional image of the target object, and determine a second weighted sum of the at least one of the distance, where the second weighted sum represents a two-dimensional similarity between the two-dimensional image of the target object and at least one two-dimensional image in the set of two-dimensional images for the objects.

According to the eighth possible implementation form of the second aspect of the present invention, in a ninth possible implementation form of the second aspect of the present invention, the identifying module is specifically configured to determine a third weighted sum of the two-dimensional similarity and the three-dimensional image similarity, where the third weighted sum represents a similarity between the target object and at least one object in a set of objects, identify the target object in the set of objects according to the similarity determined by the identifying module.

According to the second aspect of the present invention or any one of the first possible implementation form of the second aspect of the present invention to the ninth possible implementation form of the second aspect of the present invention, in a tenth possible implementation form of the second aspect of the present invention, the target object includes a target face, and the three-dimensional image of target object includes a three-dimensional face curved surface of the target face;

the three-dimensional feature of the target object includes at least one three-dimensional face feature curve of the target face;

the at least one three-dimensional face feature curve of the target face plane includes a curve where at least one plane intersects with the three-dimensional face curved surface of the target face or a curve where a part of the plane intersects with the three-dimensional face curved surface of the target face, or a set of points in the three-dimensional face curved surface of the target face with a distance to the intersecting curve less than or equal to a first threshold; or, at least one three-dimensional face feature curve of the target face includes a curve where at least one curved surface intersects with the three-dimensional face curved surface of the target face or a curve where a part of the curved surface intersects with the three-dimensional face curved surface of the target face, or a set of points in the three-dimensional face curved surface of the target face with a distance to the intersecting curve less than or equal to a first threshold.

According to the seventh possible implementation form of the second aspect, in an eleventh possible implementation form of the second aspect of the present invention, the three-dimensional face feature curve is located in upper half of the face including a tip point of a nose.

According to the tenth possible implementation form of the second aspect of the present invention or the eleventh possible implementation form of the second aspect of the present invention, in a twelfth possible implementation form of the second aspect of the present invention, the at least one plane is perpendicular to a face feature plane of the target face, the face feature plane of the target face includes a plane in which three of the following feature points are located, the three points include: one point or two points of an inner corner point of a left eye, an outer corner point of the left eye, an inner corner point of a right eye, and an outer corner point of the right eye; at least one of a left corner point of a mouth, and a right corner point of the mouth; and a tip point of a nose.

According to the twelfth possible implementation form of the second aspect of the present invention, in a thirteenth possible implementation form of the second aspect of the present invention, the at least one plane intersects at the first straight line, the first straight line is perpendicular to the face feature plane of the target face, and the first straight line passes the tip point of the nose on the target face.

According to any one of the tenth possible implementation form of the second aspect of the present invention to the thirteenth possible implementation form of the second aspect of the present invention, in a fourteenth possible implementation form of the second aspect of the present invention, the apparatus further includes a face pose adjusting module, the face pose adjusting module, configured to performing, under a three-dimensional coordinate system whose original point is a tip point of a nose on a target face, a pose adjustment to the three-dimensional face curved surface of the target face, the face pose adjusting module includes a first face pose adjusting module and a second face pose adjusting module;

the first face pose adjusting module, configured to perform pose adjustment according to a normal vector of the face feature plane of the target face;

The second face pose adjusting module, configured to perform pose adjustment according to vector which is determined according to a left corner point of a mouth and a right corner point of the mouth on the three-dimensional face curved surface of the target face.

According to the fourteenth possible implementation form of the second aspect of the present invention, in a fifteenth possible implementation form of the second aspect of the present invention, the first face pose adjusting module is specifically configured to determine a rotation matrix $R_z$ for rotating the normal vector of the face feature plane of the target face to a direction as same as a positive direction of a Z axis in the three-dimensional coordinate system, where an included angle between the normal vector and the positive direction of the Z axis is an acute angle, rotate the three-dimensional face curved surface of the target face according to the rotation matrix $R_z$;

the second face pose adjusting module is specifically configured to determine a rotation matrix $R_x$ for rotating the vector that is determined according to the left corner point of the mouth and the right corner point of the mouth on the target face to a direction as same as a positive direction of an X axis in the three-dimensional coordinate system, an included angle between the determined vector and the positive direction of the X axis is an acute angle, rotate the three-dimensional face curved surface of the target face according to the rotation matrix $R_x$.

According to any one of the tenth possible implementation form of the second aspect of the present invention to the fifteenth possible implementation form of the second aspect of the present invention, in a sixteenth possible implementation form of the second aspect of the present invention, the identifying module is specifically configured to determine a distance between the at least one three-dimensional face feature curve of the target face and the at least one three-dimensional face feature curve corresponding to at least one face in a set of faces, and determine a first weighted sum of the obtained at least one distance, the first weighted sum represents a three-dimensional face similarity between the target face and at least one face in the set of faces.

According to the sixteenth possible implementation form of the second aspect of the present invention, in a seventeenth possible implementation form of the second aspect of the present invention, the acquiring module is specifically configured to acquire a two-dimensional feature of the target face and a two-dimensional feature of at least one face in a set of faces using a convolutional neural network model;

the identifying module is specifically configured to determine a distance between the two-dimensional feature of the at least one face in the set of faces and the two-dimensional feature of the target face, and determine a second weighted sum of the at least one of the distance, where the second weighted sum represents a two-dimensional face similarity between the target face and at least one face in the set of faces.

According to the seventeenth possible implementation form of the second aspect of the present invention, in an eighteenth possible implementation form of the second aspect of the present invention, the identifying module is specifically configured to determine a third weighted sum of the two-dimensional face similarity of the target face and the three-dimensional face similarity of the target face, where the third weighted sum represents a similarity between the target face and at least one face in a set of faces, specifically configured to identify the target face in the set of faces according to the similarity of the at least one face.

According to any one of the first possible implementation form of the second aspect of the present invention to the eighteenth possible implementation form of the second aspect of the present invention, in a nineteenth possible implementation form of the second aspect of the present invention, the included angle between two adjacent planes in the at least one plane is a first angle.

According to the nineteenth possible implementation form of the second aspect of the present invention, in twentieth possible implementation form of the second aspect of the present invention, the first angle is 10 degrees.

A third aspect of the present invention provides a computer readable storage medium, the computer readable storage medium is stored with a computer program, where the computer program performs a step of the method according to the first aspect of the present invention or any one of the first possible implementation form of the first aspect of the present invention to the twentieth possible implementation form of the first aspect of the present invention.

A fourth aspect of the present invention provides an apparatus for pattern recognition, including a memory, second processor and a computer program stored in the memory and executable on the second processor, where the computer program performs a step of the method according to the first aspect of the present invention or any one of the first possible implementation form of the first aspect of the present invention to the twentieth possible implementation form of the first aspect of the present invention when executed by the second processor.

A method and an apparatus for pattern recognition provided in the present invention, can reduce restrictions on acquiring the image of the target object, for example, reduce the restrictions on the image of the target object in terms of postures, lighting, expressions, make-up and occlusion, thereby improving an accuracy of recognizing the target object and improving a recognition rate and reducing recognition time at the same time.

DESCRIPTION OF EMBODIMENTS

Figure 1:
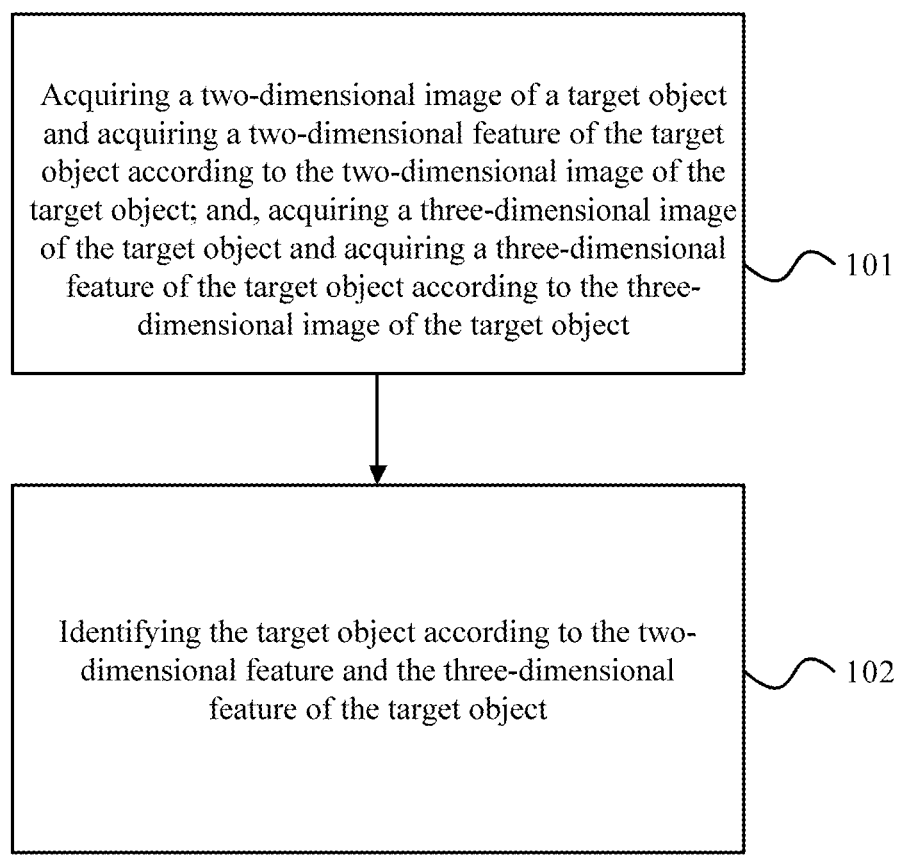
FIG. 1 is a flowchart of a method for pattern recognition according to a first embodiment of the present invention.

Technical solutions in the embodiments of the present invention will be described hereunder detailedly in conjunction with drawings in the embodiments of the present invention.

Terms such as "first", "second" and the like in the specification and claims of the present invention as well as in the described drawings are intended to distinguish different objects, but not intended to define a particular order.

The term such as "and/or" in the embodiments of the present invention is merely used to describe an association between associated objects, which indicates that there may be three relationships, for example, A and/or B may indicate presence of A only, of both A and B, and of B only.

In the embodiments of the present invention, expressions such as "exemplary" or "for example" are used to indicate illustration of an example or an instance. In the embodiments of the present invention, any embodiment or design scheme described as "exemplary" or "for example" should not be interpreted as preferred or advantageous over other embodiments or design schemes. In particular, the use of "exemplary" or "for example" is aimed at presenting related concepts in a specific manner.

It should be noted that, for the sake of conciseness and clarity of illustration, elements shown in the drawings are not necessarily drawn to scale. For example, for the sake of clarity, dimensions of some elements may be increased relative to other elements. In addition, reference numerals may be repeated among the drawings where necessary to indicate that corresponding or similar elements target at the same issue.

A method for pattern recognition according to a first embodiment of the present invention will be described hereunder specifically in conjunction with FIG. 1. As shown in FIG. 1, the method includes:

Step 101, acquiring a two-dimensional image of a target object and acquiring a two-dimensional feature of the target object according to the two-dimensional image of the target object, and acquiring a three-dimensional image of the target object and acquiring a three-dimensional feature of the target object according to the three-dimensional image of the target object.

Step 102, identifying the target object according to the two-dimensional feature and the three-dimensional feature of the target object.

Optionally, the acquiring a two-dimensional feature of the target object according to the two-dimensional image of the target object includes:

The two-dimensional feature of the target object can be acquired through a deep learning method. For example, the two-dimensional feature of a target object can be extracted using a Convolutional Neural Network (CNN) model. The convolutional neural network model can be obtained by learning millions of training samples, and adapts well in terms of change in different postures, different lighting conditions and different scales of the target object.

Optionally, the three-dimensional image of the target object can be obtained and stored in a memory by a depth camera apparatus, such as a depth camera. The depth camera can be equipped onto various types of terminals, such as laptops, cell phones, or surveillance camera apparatus.

Optionally, the two-dimensional image and the three-dimensional image of the target object may be acquired by the same depth camera apparatus, or the three-dimensional image may be acquired by the depth camera apparatus, and the two-dimensional image may be acquired by a normal camera apparatus (a non-depth camera apparatus). The processor can acquire the two-dimensional image and the three-dimensional image from the memory.

Optionally, the three-dimensional image of the target object includes a three-dimensional curved surface of the target object, the three-dimensional feature of the target object includes at least one three-dimensional feature curve of the three-dimensional curved surface of the target object; the at least one three-dimensional feature curve includes a curve where at least one plane intersects with the three-dimensional curved surface of the target object or a curve where a part of the plane intersects with the three-dimensional curved surface of the target object, or a set of points in the three-dimensional curved surface of the target object with a distance to the intersecting curve less than or equal to a first threshold; or, the at least one three-dimensional feature curve includes a curve where at least one curved surface intersects with the three-dimensional curved surface of the target object or a curve where a part of the curved surface intersects with the three-dimensional curved surface of the target object, or a set of points in the three-dimensional curved surface of the target object with a distance to the intersecting curve less than or equal to a first threshold. Optionally, the three-dimensional curved surface of the target object may include some redundant images, an approximate center point of the three-dimensional image of the target object may be used as a center point to perform ball-cutting, most feature information of the target object may be retained in the cut three-dimensional image. Optionally, if a partial region of the three-dimensional curved surface of the target object includes most of the feature information of the three-dimensional image of the target object, consequently, the aforementioned part of the plane refers to the partial plane intersecting with the partial region. Similarly, the aforementioned part of the curved surface refers to the partial curved surface intersecting with the partial region. Optionally, the at least one curved surface or the part of the curved surface mentioned above may include a cylindrical surface with its center point being as same as a certain feature point or an approximate center point in the three-dimensional image, or a part of the cylindrical surface with the same center point, such as the upper half.

Optionally, the at least one plane mentioned above may be evenly distributed, for example, the included angle between two adjacent planes in the at least one plane is a first angle. Optionally, the first angle is 10 degrees. The first angle can also be other values, such as 18 degrees. The at least one plane may also be unevenly distributed according to the distribution of the feature points of the three-dimensional image of the target object, that is, the angle between the two adjacent planes in the at least one plane may be determined according to the distribution of the feature points of the three-dimensional image of the target object.

Optionally, the three-dimensional feature curve includes a three-dimensional feature band, and the feature band can be regarded as being composed of multiple feature curves. The three-dimensional feature band can be obtained by the following method: after determining a curve where the aforementioned plane or curved surface intersects with the three-dimensional curved surface of the target object, determining a set of points in the three-dimensional curved surface of the target object with a distance to the intersecting curve less than or equal to a first threshold, the set of points is the three-dimensional feature band, the distance mentioned above may be an Euclidean distance or a Hausdorff distance or a Geodesic distance, the threshold mentioned above may be set according to the distribution of the feature points or the shape of features of the target object, for example, may be 0.3.

The three-dimensional feature of the target object is concentrated in a first region, where the first region includes a partial region of the three-dimensional curved surface of the target object, and the at least one three-dimensional feature curve is located in the first region. Optionally, taking a face as an example, it may be approximately assumed that the upper half of the face with the tip point of the nose being a boundary includes most features of the face, correspondingly, the first region is the upper half of the face with the tip point of the nose being the boundary, then the feature curve of the face is a curve segment in the upper half of the face. Taking a tree as an example, it can be approximately assumed that a crown part includes most features of the tree, correspondingly, the first region is the crown part or the crown part plus a small part of the trunk, then the feature curve of the tree is a curve segment in the three-dimensional curved surface of the crown or the crown plus a small part of the trunk.

Optionally, the at least one plane is perpendicular to a feature plane of the three-dimensional curved surface of the target object, and the feature plane of the three-dimensional curved surface of the target object includes a plane in which three feature points on the three-dimensional curved surface of the target object are located. For example, taking a face as an example, the three feature points mentioned above may be: one point or two points of an inner corner point of a left eye, an outer corner point of the left eye, an inner corner point of a right eye, and an outer corner point of the right eye; at least one of a left corner point of a mouth, and a right corner point of the mouth; and a tip point of a nose.

Then, the plane in which the three feature points are located may be the plane in which the inner corner point of the left eye, the left corner point of the mouth, and the right corner point of the mouth are located.

Optionally, the at least one plane intersects at a first straight line, and the first straight line is perpendicular to the feature plane of the three-dimensional curved surface of the target object. Optionally, the at least one plane may not intersect at a straight line according to the distribution conditions of the three-dimensional feature of the three-dimensional curved surface of the target object. If the three-dimensional feature of the three-dimensional curved surface of the target object mentioned above is distributed in the first region mentioned above, the at least one plane may intersect at a straight line segment.

Optionally, before acquiring the three-dimensional feature of the target object according to the three-dimensional image of the target object, the method further includes:

performing, under a three-dimensional coordinate system whose original point is a feature point on the three-dimensional curved surface of the target object, a pose adjustment to the three-dimensional curved surface of the target object, wherein the pose adjustment comprises at least one of the following: performing a pose adjustment according to a normal vector of the feature plane of the three-dimensional curved surface of the target object; and selecting two feature points on the three-dimensional curved surface of the target object, and performing a pose adjustment according to the vector where the two feature points are located.

In the three-dimensional coordinate system mentioned above, the positive axis direction of the Z axis is determined according to the right-hand rule. The right-hand rule also determines the positive rotating direction for any one of the axes in the three-dimensional space. To mark the positive axis directions of the X, Y, and Z axes, place the right hand back against the screen with its thumb pointing to the positive direction of the X axis. Stretch out the index finger and the middle finger, point to the positive direction of the Y axis with the index finger, and the direction indicated by the middle finger is the positive direction of the Z axis.

Optionally, one method for selecting two feature points on the three-dimensional curved surface of the target object may be to select the vector where the two feature points are located to be similar to the direction of the X axis of the three-dimensional coordinate system. For example, if the target object is a face, the two feature points may be a left corner point of the mouth and a right corner point of the mouth. The included angle between the vector where the left corner point and the right corner point and the X axis of the three-dimensional coordinate system is an acute angle.

The approximate center point of the three-dimensional curved surface of the target object can be regarded as one of the feature points, so the original point can also be the approximate center point of the three-dimensional curved surface of the target object. Taking a face as an example, the original point can be a tip point of a nose or a philtrum.

Optionally, where the performing the pose adjustment according to a normal vector of the feature plane of the three-dimensional curved surface of the target object includes:

determining a rotation matrix $R_z$ for rotating the normal vector of the feature plane of the three-dimensional curved surface of the target object to a direction as same as a positive direction of a Z axis in the three-dimensional coordinate system, where an included angle between the normal vector and the positive direction of the Z axis is an acute angle, rotating the three-dimensional curved surface of the target object according to the rotation matrix $R_z$;

where the performing the pose adjustment according to the vector where the two feature points are located includes:

determining a rotation matrix $R_x$ for rotating the vector where the two feature points are located to a direction as same as a positive direction of an X axis in the three-dimensional coordinate system, where an included angle between the vector where the two feature points are located and the positive direction of the X axis is an acute angle, rotating the three-dimensional curved surface of the target object according to the rotation matrix $R_x$.

The included angle between the normal vector of the feature plane of the three-dimensional curved surface of the target object and the positive direction of the Z axis is an acute angle. Similarly, the included angle between the vector where the two feature points are located and the positive direction of the X axis is an acute angle.

Optionally, the rotations are performed according to the Z axis and the X axis in the present invention to perform the pose adjustment. Persons of ordinary skill in the art may know that, the rotations may also be performed according to the X axis and the Y axis to perform the pose adjustment or according to the Z axis and Y axis to perform the pose adjustment, which is not limited in the present invention.

Optionally, the method further includes: determining a distance between the at least one three-dimensional feature curve of the target object and at least one three-dimensional feature curve corresponding to at least one three-dimensional image in a set of three-dimensional images for objects, and determining a first weighted sum of the obtained at least one distance, where the first weighted sum represents a three-dimensional image similarity between the three-dimensional image of the target object and at least one three-dimensional image in the set of three-dimensional images for the objects.

Optionally, the aforementioned corresponding means that: a feature curve A where the plane mentioned above intersects with the three-dimensional curved surface of the target object corresponds to a feature curve B where the same plane intersects with a three-dimensional image in the set of three-dimensional images for the objects. The distance between the three-dimensional curves is the distance between the feature curve A and the feature curve B. The distance can be an Euclidean distance, also can be a Hausdorff distance or a Geodesic distance. Obtaining the distances $\varphi_i$ corresponding to different planes using the same way, then calculating the first weighted sum $S_3=\Sigma_{i=1}^{n} w_i \cdot \varphi_i$ of the obtained at least one distance, where, n is the number of the planes mentioned above, $w_i$ is the weight. The $S_3$ may represent a three-dimensional image similarity between the three-dimensional image of the target object and at least one three-dimensional image in the set of three-dimensional images for the objects.

Optionally, where the acquiring the two-dimensional feature of the target object according to the two-dimensional image of the target object includes: acquiring the two-dimensional feature of the two-dimensional image of the target object and a two-dimensional feature of at least one two-dimensional image in a set of two-dimensional images for objects; the method further includes: determining a distance between the two-dimensional feature of the at least one two-dimensional image in the set of two-dimensional images for the objects and the two-dimensional feature of the two-dimensional image of the target object, and determining a second weighted sum of at least one of the distance, where the second weighted sum represents a two-dimensional similarity between the two-dimensional image of the target object and at least one two-dimensional image in the set of two-dimensional images for the objects.

Optionally, the two-dimensional feature of the target object and the two-dimensional feature of the at least one two-dimensional image in the set of two-dimensional images for the objects can be acquired through a deep learning method, for example, using a Convolutional Neural Network (CNN) model. The convolutional neural network model can be obtained by learning training samples, and adapts well in terms of change in different postures, different lighting conditions and different scales of the target object to a certain extent. The two-dimensional similarity is denoted as $S_2$. Orders for performing the steps of calculating and obtaining the two-dimensional similarity $S_2$ and the three-dimensional similarity $S_3$ are not limited herein.

Optionally, the method further includes: determining a third weighted sum of the two-dimensional similarity and the three-dimensional similarity, where the third weighted sum represents a similarity between the target object and at least one object in a set of objects; identifying the target object in the set of objects according to the similarity. The third weighted sum mentioned above is $S=w_2 S_2+w_3 S_3$, where, $S_2$ is the two-dimensional similarity, $S_3$ is the three-dimensional similarity, $w_2$ and $w_3$ are weights, S is the similarity between the target object and the at least one object in the set of objects. In an application, such as an access control face recognition application, a threshold may be set, when the value of S is greater than the threshold, it is determined that the target face belongs to the set of faces, and if the set of faces is an accessible set of faces, the door opens. In another application, the similarities between the target object and each object in the set of objects may be calculated, and an object with the highest similarity in the set of objects may be selected as the final recognition result, that is, the object with the highest similarity is the target object. Optionally, $w_2 \in (0.5, 1]$, $w_3 \in [0.0, 0.5)$, such as $w_2=0.6$, $w_3=0.4$.

A method for pattern recognition provided in the present invention, can reduce restrictions on acquiring the image of the target object, for example, reduce the restrictions on the image of the target object in terms of postures, lighting, expressions, make-up and occlusion, thereby improving the accuracy of recognizing the target object and improving the recognition rate and reducing the recognition time at the same time.

Figure 2:
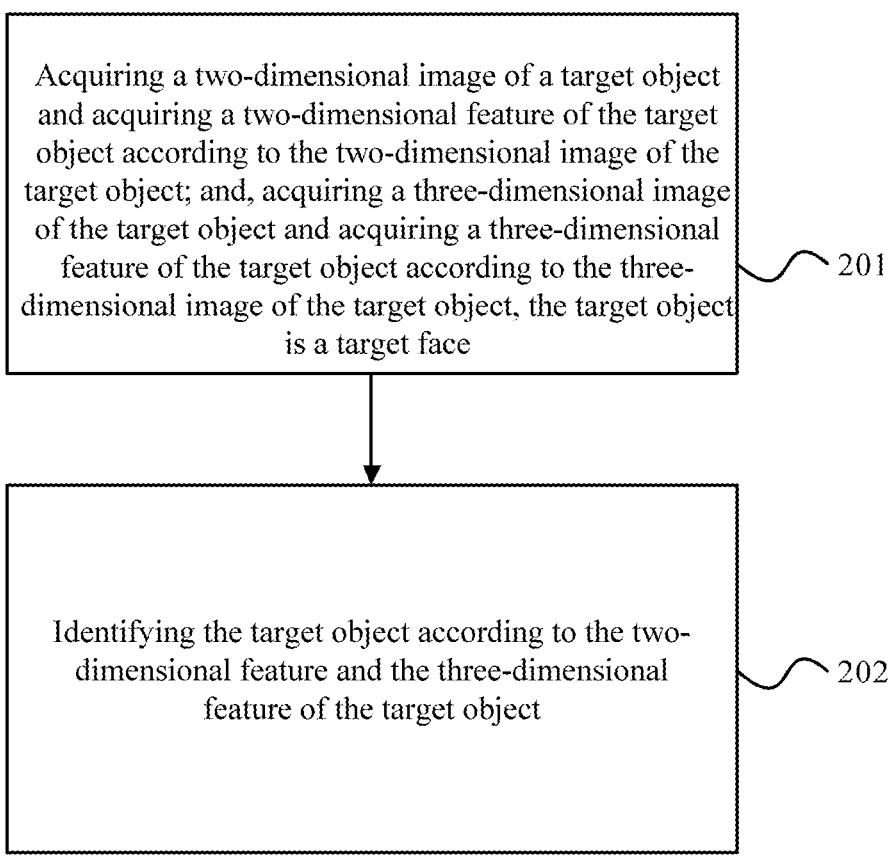
FIG. 2 is a flowchart of another method for pattern recognition according to a second embodiment of the present invention.

A method for pattern recognition according to a second embodiment of the present invention will be described hereunder specifically in conjunction with FIG. 2. In the present embodiment, a face recognition method using two-dimensional face images and three-dimensional face images is described in detail by taking a face as an example. The method includes:

step 201, acquiring a two-dimensional image of a target object and acquiring a two-dimensional feature of the target object according to the two-dimensional image of the target object, and acquiring a three-dimensional image of the target object and acquiring a three-dimensional feature of the target object according to the three-dimensional image of the target object, the target object mentioned above is a target face.

Step 202, identifying the target object according to the two-dimensional feature and the three-dimensional feature of the target object.

The two-dimensional image of the target object includes a two-dimensional face image of the target face, the three-dimensional image of target object includes a three-dimensional face curved surface of the target face.

Figure 3:
FIG. 3 is a schematic view of a method for acquiring a three-dimensional face feature curve.

The three-dimensional feature of the target object includes at least one three-dimensional face feature curve of the target face, the at least one three-dimensional face feature curve of the target face plane includes a curve where at least one plane intersects with the three-dimensional face curved surface of the target face or a curve where a part of the plane intersects with the three-dimensional face curved surface of the target face, or a set of points in the three-dimensional face curved surface of the target face with a distance to the intersecting curve less than or equal to a first threshold, or, at least one three-dimensional face feature curve of the target face includes a curve where at least one curved surface intersects with the three-dimensional face curved surface of the target face or a curve where a part of the curved surface intersects with the three-dimensional face curved surface of the target face, or a set of points in the three-dimensional face curved surface of the target face with a distance to the intersecting curve less than or equal to a first threshold. As shown in FIG. 3, the black plane is one of the at least one plane mentioned above, and the intersecting line of the plane and the face curved surface in FIG. 3 is the three-dimensional face feature curve mentioned above. Optionally, if a partial region of the three-dimensional face curved surface of the target face includes most feature information of the three-dimensional image of the target face, the part of the plane mentioned above refers to the partial plane intersecting with the partial region, that is, the part where the black plane in FIG. 3 intersects with the three-dimensional face curved surface. Similarly, if the three-dimensional face image of the target face is cut with a curved surface, the part of the curved surface mentioned above refers to the partial curved surface intersecting with the partial region. Optionally, the at least one curved surface or the part of the curved surface mentioned above may include a cylindrical surface with its center point being as same as a certain feature point or an approximate center point in the three-dimensional image, or a part of the cylindrical surface with the same center point, such as the upper half.

Optionally, the at least one plane mentioned above may be evenly distributed, for example, the included angle between two adjacent planes in the at least one plane is a first angle. Optionally, the first angle is 10 degrees. The first angle can also be other values, such as 18 degrees. The at least one plane may also be unevenly distributed according to the distribution of the feature points of the three-dimensional image of the target face, that is, the angle between the two adjacent planes in the at least one plane may be determined according to the distribution of the feature points of the three-dimensional image of the target face.

Optionally, since the original three-dimensional face curved surface obtained by a three-dimensional camera apparatus includes redundant regions such as the neck, the shoulder and the like, the method may further include: perform ball-cutting on the original three-dimensional face curved surface by taking the tip point of the nose on the three-dimensional face curved surface obtained by the camera apparatus as a center and by taking a first radius as a radius, and obtaining the three-dimensional face curved surface mentioned above as shown in FIG. 3, the first radius may be selected according to actual sizes of the image, such as 90 mm.

Optionally, the two-dimensional feature of the target face can be acquired through a deep learning method. For example, the two-dimensional feature of a target face can be extracted using a Convolutional Neural Network (CNN) model. The convolutional neural network model can be obtained by learning millions of training samples, and adapts well in terms of change in postures of faces, expressions, lighting, scales and the like within a certain range for different races and different ages.

Optionally, the three-dimensional image of the target face can be obtained by a depth camera apparatus, such as a depth camera. The depth camera can be equipped onto various types of terminals, such as laptops, cell phones, or surveillance camera apparatus. Optionally, the two-dimensional image of the target face and the three-dimensional image of the target face may be acquired by the same depth camera apparatus, or the three-dimensional image may be acquired by the depth camera apparatus, and the two-dimensional image of the target face may be acquired by a normal camera apparatus (a non-depth camera apparatus).

Optionally, the three-dimensional feature curve mentioned above includes a three-dimensional feature band, and the feature band can be regarded as being composed of multiple feature curves. The three-dimensional feature band can be obtained by the following method: after determining a curve where the aforementioned one plane or curved surface intersects with the three-dimensional curved surface of the target object, determining a set of points in the three-dimensional curved surface of the target face with a distance to the intersecting curve less than or equal to a first threshold, the set of points is the three-dimensional feature band, the distance mentioned above may be an Euclidean distance or a Hausdorff distance or a Geodesic distance, the threshold mentioned above may be set according to the distribution of the feature points or the shape of features of the target object, for example, may be 0.3.

Figure 4:
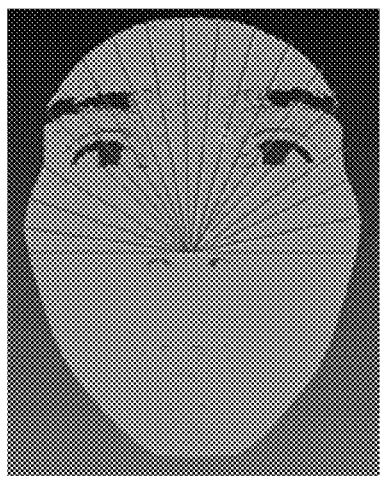
FIG. 4 is a projection schematic view of a plurality of acquired three-dimensional face feature curves.

Optionally, taking a face as an example, it may be approximately assumed that the upper half of the face with the tip point of the nose being a boundary includes most features of the face, correspondingly, the three-dimensional face feature curve is located on the upper half of the face including the tip point of the nose. Then, the feature curve of the face is a curve segment in the upper half of the face, as shown in FIG. 4, the straight line segment in FIG. 4 is the projection of the curve segment mentioned above. Meanwhile, FIG. 4 also shows the projection of the at least one plane mentioned above, as can be known from the figure, there are 19 planes that intersect with the three-dimensional face curved surface of the target face in total, and the angles between adjacent planes are 18 degrees, consequently, there are 19 feature curves of the target face in FIG. 4.

Optionally, the at least one plane is perpendicular to a face feature plane of the target face, the face feature plane of the target face includes a plane in which three of the following feature points are located, the three points include: one point or two points of an inner corner point of a left eye, an outer corner point of the left eye, an inner corner point of a right eye, and an outer corner point of the right eye; at least one of a left corner point of a mouth, and a right corner point of the mouth; and a tip point of a nose. For example, the face feature plane of the target face may be the plane in which the inner corner point of the left eye, the left corner point of the mouth, and the right corner point of the mouth located.

Optionally, the at least one plane intersects at the first straight line, and the first straight line is perpendicular to the face feature plane of the target face and the first straight line passes the tip point of the nose on the target face. As shown in FIG. 4, the projection of the first straight line is a point at which the projections of the at least one plane intersects.

The above-mentioned method for obtaining the three-dimensional face feature curve of the target face not only commendably retains most geometric information of the face but also greatly simplifies the data amount of the recorded three-dimensional face curved surface of the target face.

Optionally, before acquiring the three-dimensional feature of the target object according to the three-dimensional image of the target object, the method further includes: performing, under a three-dimensional coordinate system whose original point is a tip point of a nose on a target face, a pose adjustment to the three-dimensional face curved surface of the target face, wherein the pose adjustment comprises at least one of the following: performing a pose adjustment according to a normal vector of the face feature plane of the target face; and performing a pose adjustment according to a vector which is determined according to a left corner point of a mouth and a right corner point of the mouth on the three-dimensional face curved surface of the target face.

Where the performing the pose adjustment according to the normal vector of the face feature plane of the target face includes: determining a rotation matrix $R_z$ for rotating the normal vector of the face feature plane of the target face to a direction as same as a positive direction of a Z axis in the three-dimensional coordinate system, where an included angle between the normal vector and the positive direction of the Z axis is an acute angle, rotating the three-dimensional face curved surface of the target face according to the rotation matrix $R_z$.

Where the performing the pose adjustment according to vector which is determined according to the left corner point of the mouth and the right corner point of the mouth on the target face includes: determining a rotation matrix $R_x$ for rotating the vector which is determined according to the left corner point of the mouth and the right corner point of the mouth on the target face to a direction as same as a positive direction of an X axis in the three-dimensional coordinate system, where an included angle between the determined vector and the positive direction of the X axis is an acute angle, rotating the three-dimensional face curved surface of the target face according to the rotation matrix $R_x$.

Specifically, redundant regions including the neck and the shoulder are cut out to obtain a three-dimensional face curved surface to be pose-adjusted after performing ball-cutting on the obtained original three-dimensional face curved surface by taking the tip point of the nose as a center, and taking a first radius as a radius, then performs a pose adjustment to the three-dimensional face curved surface to be pose-adjusted.

Figure 5:
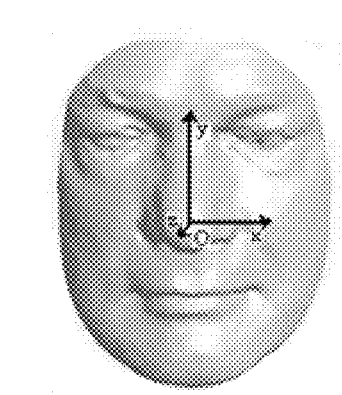
FIG. 5 is a schematic view of pose adjustment to the three-dimensional face curved surface.

Firstly, as shown in FIG. 5, the three-dimensional face curved surface to be pose-adjusted is translated to a three-dimensional coordinate system whose original point is the tip point of the nose. In the three-dimensional coordinate system mentioned above, the positive axis direction of the Z axis is determined according to the right-hand rule. The right-hand rule also determines the positive rotating direction for any one of the axes in the three-dimensional space. To mark the positive axis directions of the X, Y, and Z axes, place right hand back against the screen with its thumb pointing to the positive direction of the X axis. Stretch out the index finger and the middle finger, point to the positive direction of the Y axis with the index finger, and the direction indicated by the middle finger is the positive direction of the Z axis. Optionally, the selection of the original point may be the tip point of the nose, or may also be the philtrum, that is, the three-dimensional face curved surface to be pose-adjusted may also be translated to a coordinate system whose original point is the philtrum.

Then, the normal vector of the face feature plane of the target face is determined. The face feature plane may be a plane in which the inner corner point of the right eye, the left corner point of the mouth and the right corner point of the mouth are located, and the included angle between the normal vector and the positive direction of the Z axis of the three-dimensional coordinate system mentioned above is an acute angle, calculating a rotation matrix $R_z$ for rotating the normal vector to a direction as same as the positive direction of the Z axis in the three-dimensional coordinate system, rotating the three-dimensional face curved surface of the target face according to the rotation matrix $R_z$. Similarly, the vector where the left corner point of the mouth and the right corner point of the mouth are located is determined, where an included angle between the vector where the left corner point of the mouth and the right corner point of the mouth are located and the positive direction of the X axis of the three-dimensional coordinate system is an acute angle, calculating a rotation matrix $R_x$ for rotating the vector where the left corner point of the mouth and the right corner point of the mouth are located to a direction as same as the positive direction of the X axis in the three-dimensional coordinate system, rotating the three-dimensional face curved surface of the target face according to the rotation matrix $R_x$. Optionally, the three-dimensional face curved surface of the target face may be rotated according to the rotation matrix $R_x$ at first, and then according to the rotation matrix $R_z$.

Optionally, the rotations are performed according to the Z axis and the X axis the present invention to perform the pose adjustment. Persons of ordinary skill in the art may know that, the rotations may also be performed according to the X axis and the Y axis to perform the pose adjustment or according to the Z axis and Y axis to perform the pose adjustment, which is not limited in the present invention, and the orders of the two successive rotations are also not limited in the present invention.

Optionally, the method further includes: determining a distance between the at least one three-dimensional face feature curve of the target face and the at least one three-dimensional face feature curve corresponding to at least one face in a set of faces, and determining a first weighted sum of the obtained at least one distance, where the first weighted sum represents a three-dimensional face similarity between the target face and at least one face in the set of faces.

Specifically, after obtaining the 19 three-dimensional feature curves of the target face, obtaining the 19 three-dimensional feature curves of face A in the set of faces using the same way mentioned above. The distances between the three-dimensional feature curves of the target face and the three-dimensional feature curves corresponding to the face A in the set of faces are calculated respectively, 19 distance values can be obtained, and the first weighted sum of the 19 distance values is calculated. The first weighted sum represents a three-dimensional face similarity between the target face and the face A. In detail, the aforementioned corresponding means that: a feature curve A where the plane mentioned above intersects with the three-dimensional curved surface of the target object corresponds to a feature curve B where the same plane intersects with the face A in the set of faces. The distance between the three-dimensional curves mentioned above is the distance between the feature curve A and the feature curve B. The distance can be an Euclidean distance, also can be a Hausdorff distance or a Geodesic distance. Obtaining the 19 distances $\varphi_i$ (i=1, 2, 3, ..., 19) corresponding to different planes using the same way, then calculating the first weighted sum $S_3 = \sum_{i=1}^{n} w_i \cdot \varphi_i$ of the obtained 19 distances, where, n is the number of the planes mentioned above, $w_i$ (i=1, 2, 3, ..., 19) is the weight. The $S_3$ may represent a three-dimensional face similarity between the three-dimensional face curved surface of the target face and the face A in the set of faces.

Optionally, where the acquiring the two-dimensional feature of the target object according to the two-dimensional image of the target object includes: acquiring a two-dimensional feature of the target face and a two-dimensional feature of at least one face in the face set using a convolutional neural network model; the method further includes: determining a distance between the two-dimensional feature of the at least one face in the set of faces and the two-dimensional feature of the target face, and determining a second weighted sum of the at least one of the distance, where the second weighted sum represents a two-dimensional face similarity between the target face and at least one face in the set of faces.

Specifically, the two-dimensional feature of the two-dimensional image of the target face and the two-dimensional feature of the two-dimensional image of face A in the set of faces can be acquired through a deep learning method, for example, using a Convolutional Neural Network (CNN) model. The convolutional neural network model can be obtained by learning training samples, and adapts well in terms of change in different postures, different lighting conditions and different scales of the target object to a certain extent. The two-dimensional similarity is denoted as $S_2$. Orders for performing the steps of calculating and obtaining the two-dimensional face similarity $S_2$ and the three-dimensional face similarity $S_3$ are not limited herein.

Optionally, the method further includes: determining a third weighted sum of the two-dimensional face similarity of the target face and the three-dimensional face similarity of the target face, where the third weighted sum represents a similarity between the target face and at least one face in a set of faces; identifying the target face in the set of faces according to the similarity of the at least one face.

Specifically, the third weighted sum mentioned above is $S = w_2 S_2 + w_3 S_3$, where, $S_2$ is the two-dimensional similarity between the target face and the face A, $S_3$ is the three-dimensional similarity between the target face and the face A, $w_2$ and $w_3$ are weights, S is the similarity between the target face and the face A. In an application, such as an access control face recognition application, a threshold may be set, when the value of S is greater than the threshold, it is determined that the target face is the face A, and if the face A belongs to an accessible set of faces, the door opens. In another application, the similarities between the target face and each face in a set of faces may be calculated, and a face with the highest similarity in the set of faces may be selected as the final recognition result, that is, the face with the highest similarity is the target face. Optionally, $w_2 \in (0.5, 1]$, $w_3 \in [0.0, 0.5)$, such as $w_2=0.6$, $w_3=0.4$.

A method for pattern recognition provided in the present invention, can reduce restrictions on acquiring the image of the target object, for example, reduce the restrictions on the image of the target object in terms of postures, lighting, expressions, make-up and occlusion, thereby improving the accuracy of recognizing the target object and improving the recognition rate and reducing the recognition time at the same time.

Figure 6:
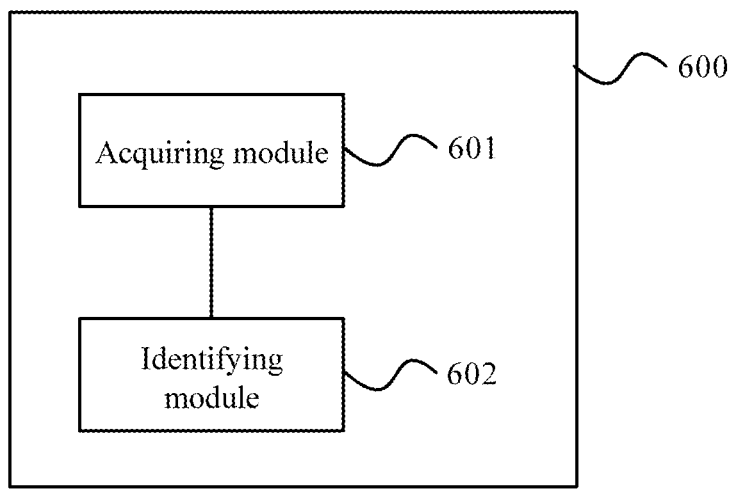
FIG. 6 is a structural diagram of an apparatus for pattern recognition according to a third embodiment of the present invention.

An apparatus for pattern recognition according to a third embodiment of the present invention will be described hereunder specifically in conjunction with FIG. 6. Reference may be made to the descriptions in the first method embodiment, the apparatus can be equipped onto various types of terminals, such as laptops, cell phones, or surveillance camera apparatuses. The apparatus 600 includes an acquiring module 601 and an identifying module 602, The acquiring module 601, configured to acquire a two-dimensional image of a target object and acquire a two-dimensional feature of the target object according to the two-dimensional image of the target object; and acquire a three-dimensional image of the target object and acquire a three-dimensional feature of the target object according to the three-dimensional image of the target object;

The identifying module 602, configured to identify the target object according to the two-dimensional feature and the three-dimensional feature of the target object.

Optionally, the acquiring module 601 can acquire the two-dimensional feature of the target object through a deep learning method. For example, the two-dimensional feature of the target object can be extracted using a Convolutional Neural Network (CNN) model. The convolutional neural network model can be obtained by learning millions of training samples, and adapts well in terms of change in different postures, different lighting conditions and different scales of the target object.

Specifically, the acquiring module 601 may include a depth camera apparatus, the two-dimensional image and the three-dimensional image of the target object can be acquired by the depth camera apparatus. The acquiring module 601 may also include a depth camera apparatus and a normal camera apparatus, the three-dimensional image may be acquired by the depth camera apparatus, and the two-dimensional image may be acquired by the normal camera apparatus (a non-depth camera apparatus). The acquiring module 601 may also be a processor, the processor acquires the two-dimensional image and the three-dimensional image mentioned above from a memory.

Optionally, the three-dimensional image of the target object includes a three-dimensional curved surface of the target object, the three-dimensional feature of the target object includes at least one three-dimensional feature curve of the three-dimensional curved surface of the target object; the at least one three-dimensional feature curve includes a curve where at least one plane intersects with the three-dimensional curved surface of the target object or a curve where a part of the plane intersects with the three-dimensional curved surface of the target object, or a set of points in the three-dimensional curved surface of the target object with a distance to the intersecting curve less than or equal to a first threshold; or, the at least one three-dimensional feature curve includes a curve where at least one curved surface intersects with the three-dimensional curved surface of the target object or a curve where a part of the curved surface intersects with the three-dimensional curved surface of the target object, or a set of points in the three-dimensional curved surface of the target object with a distance to the intersecting curve less than or equal to a first threshold. Optionally, the three-dimensional curved surface of the target object may include some redundant images, an approximate center point of the three-dimensional image of the target object may be used as a center point to perform ball-cutting, most feature information of the target object may be retained in the cut three-dimensional image. Optionally, if a partial region of the three-dimensional curved surface of the target object includes most of the feature information of the three-dimensional image of the target object, consequently, the aforementioned part of the plane refers to the partial plane intersecting with the partial region. Similarly, the aforementioned part of the curved surface refers to the partial curved surface intersecting with the partial region. Optionally, the at least one curved surface or the part of the curved surface mentioned above may include a cylindrical surface with its center point being as same as a certain feature point or an approximate center point in the three-dimensional image, or a part of the cylindrical surface with the same center point, such as the upper half.

Optionally, the at least one plane mentioned above may be evenly distributed, for example, the included angle between two adjacent planes in the at least one plane is a first angle. Optionally, the first angle is 10 degrees. The first angle can also be other values, such as 18 degrees. The at least one plane may also be unevenly distributed according to the distribution of the feature points of the three-dimensional image of the target object, that is, the angle between the two adjacent planes in the at least one plane may be determined according to the distribution of the feature points of the three-dimensional image of the target object.

Optionally, the three-dimensional feature curve includes a three-dimensional feature band, and the feature band can be regarded as being composed of multiple feature curves. The three-dimensional feature band can be obtained by the following method: after determining a curve where the aforementioned plane or curved surface intersects with the three-dimensional curved surface of the target object, determining a set of points in the three-dimensional curved surface of the target object with a distance to the intersecting curve less than or equal to a first threshold, the set of points is the three-dimensional feature band, the distance mentioned above may be an Euclidean distance or a Hausdorff distance or a Geodesic distance, the threshold mentioned above may be set according to the distribution of the feature points or the shape of features of the target object, for example, may be 0.3.

The three-dimensional feature of the target object is concentrated in a first region, where the first region includes a partial region of the three-dimensional curved surface of the target object, and the at least one three-dimensional feature curve is located in the first region. Optionally, taking a face as an example, it may be approximately assumed that the upper half of the face with the tip point of the nose being a boundary includes most features of the face, correspondingly, the first region is the upper half of the face with the tip point of the nose being the boundary, then the feature curve of the face is a curve segment in the upper half of the face. Taking a tree as an example, it can be approximately assumed that a crown part includes most features of the tree, correspondingly, the first region is the crown part or the crown part plus a small part of the trunk, then the feature curve of the tree is a curve segment in the three-dimensional curved surface of the crown or the crown plus a small part of the trunk.

Optionally, the at least one plane is perpendicular to a feature plane of the three-dimensional curved surface of the target object, and the feature plane of the three-dimensional curved surface of the target object includes a plane in which three feature points on the three-dimensional curved surface of the target object are located. For example, taking a face as an example, the three feature points mentioned above may be: one point or two points of an inner corner point of a left eye, an outer corner point of the left eye, an inner corner point of a right eye, and an outer corner point of the right eye; at least one of a left corner point of a mouth, and a right corner point of the mouth; and a tip point of a nose.

Then, the plane in which the three feature points are located may be the plane in which the inner corner point of the left eye, the left corner point of the mouth, and the right corner point of the mouth are located.

Optionally, the at least one plane intersects at a first straight line, and the first straight line is perpendicular to the feature plane of the three-dimensional curved surface of the target object. Optionally, the at least one plane may not intersect at a straight line according to the distribution conditions of the three-dimensional feature of the three-dimensional curved surface of the target object. If the three-dimensional feature of the three-dimensional curved surface of the target object mentioned above is distributed in the first region mentioned above, the at least one plane may intersect at a straight line segment.

The apparatus further includes a pose adjusting module, the pose adjusting module is configured to perform, under a three-dimensional coordinate system whose origin point is a feature point on the three-dimensional curved surface of the target object, a pose adjustment before the acquiring module acquires the three-dimensional feature of the target object according to the three-dimensional image of the target object, wherein the pose adjusting module comprises at least one of the following sub-modules: a first pose adjusting sub-module and a second pose adjusting sub-module;

the first pose adjusting sub-module, configured to perform a pose adjustment according to a normal vector of the feature plane of the three-dimensional curved surface of the target object; and the second pose adjusting sub-module, configured to select two feature points on the three-dimensional curved surface of the target object, and perform a pose adjustment according to the vector where the two feature points are located.

In the three-dimensional coordinate system mentioned above, the positive axis direction of the Z axis is determined according to the right-hand rule. The right-hand rule also determines the positive rotating direction for any one of the axes in the three-dimensional space. To mark the positive axis directions of the X, Y, and Z axes, place the right hand back against the screen with its thumb pointing to the positive direction of the X axis. Stretch out the index finger and the middle finger, point to the positive direction of the Y axis with the index finger, and the direction indicated by the middle finger is the positive direction of the Z axis.

Optionally, one method for selecting two feature points on the three-dimensional curved surface of the target object may be to select the vector where the two feature points are located to be similar to the direction of the X axis of the three-dimensional coordinate system. For example, if the target object is a face, the two feature points may be a left corner point of the mouth and a right corner point of the mouth. The included angle between the vector where the left corner point and the right corner point and the X axis of the three-dimensional coordinate system is an acute angle.

The approximate center point of the three-dimensional curved surface of the target object can be regarded as one of the feature points, so the original point can also be the approximate center point of the three-dimensional curved surface of the target object. Taking a face as an example, the original point can be a tip point of a nose or a philtrum.

The first pose adjusting sub-module is specifically configured to determine a rotation matrix $R_z$ for rotating the normal vector of the feature plane of the three-dimensional curved surface of the target object to a direction as same as a positive direction of a Z axis in the three-dimensional coordinate system, where an included angle between the normal vector and the positive direction of the Z axis is an acute angle, rotate the three-dimensional curved surface of the target object according to the rotation matrix $R_z$;

The second pose adjusting sub-module is specifically configured to determine a rotation matrix $R_x$ for rotating the vector where the two feature points are located to a direction as same as a positive direction of an X axis in the three-dimensional coordinate system, where an included angle between the vector where the two feature points are located and the positive direction of the X axis is an acute angle, rotate the three-dimensional curved surface of the target object according to the rotation matrix $R_x$.

Optionally, the rotations are performed according to the Z axis and the X axis in the present invention to perform the pose adjustment. Persons of ordinary skill in the art may know that, the rotations may also be performed according to the X axis and the Y axis to perform the pose adjustment or according to the Z axis and Y axis to perform the pose adjustment, which is not limited in the present invention.

The identifying module 602 is specifically configured to determine a distance between the at least one three-dimensional feature curve of the target object and at least one three-dimensional feature curve corresponding to at least one three-dimensional image in a set of three-dimensional images for objects, and determine a first weighted sum of the obtained at least one distance, where the first weighted sum represents a three-dimensional image similarity between the three-dimensional image of the target object and at least one three-dimensional image in the set of three-dimensional images for the objects.

Optionally, the aforementioned corresponding means that: a feature curve A where the plane mentioned above intersects with the three-dimensional curved surface of the target object corresponds to a feature curve B where the same plane intersects with a three-dimensional image in the set of three-dimensional images for the objects. The distance between the three-dimensional curves is the distance between the feature curve A and the feature curve B. The distance can be an Euclidean distance, also can be a Hausdorff distance or a Geodesic distance. Obtaining the distance $\varphi_i$ corresponding to different planes using the same way, then calculating the first weighted sum $S_3 = \sum_{i=1}^{n} w_i \cdot \varphi_i$ of the obtained at least one distance, where, n is the number of the planes mentioned above, $w_i$ is the weight. The $S_3$ may represent a three-dimensional image similarity between the three-dimensional image of the target object and at least one three-dimensional image in the set of three-dimensional images for the objects.

The acquiring module 601 is specifically configured to acquire the two-dimensional feature of the two-dimensional image of the target object and a two-dimensional feature of at least one two-dimensional image in a set of two-dimensional images for objects;

The identifying module 602 is specifically configured to determine a distance between the two-dimensional feature of the at least one two-dimensional image in the set of two-dimensional images for the objects and the two-dimensional feature of the two-dimensional image of the target object, and determine a second weighted sum of the at least one of the distance, where the second weighted sum represents a two-dimensional similarity between the two-dimensional image of the target object and at least one two-dimensional image in the set of two-dimensional images for the objects.

Optionally, the two-dimensional feature of the target object and the two-dimensional feature of the at least one two-dimensional image in the set of two-dimensional images for the objects can be acquired through a deep learning method, for example, using a Convolutional Neural Network (CNN) model. The convolutional neural network model can be obtained by learning training samples, and adapts well in terms of change in different postures, different lighting conditions and different scales of the target object to a certain extent. The two-dimensional similarity is denoted as $S_2$. Orders for performing the steps of calculating and obtaining the two-dimensional similarity $S_2$ and the three-dimensional similarity $S_3$ are not in any order.

The identifying module is specifically configured to determine a third weighted sum of the two-dimensional similarity and the three-dimensional face similarity, where the third weighted sum represents a similarity between the target object and at least one object in a set of objects, identify the target object in the set of objects according to the similarity determined by the identifying module. The third weighted sum mentioned above is $S = w_2 \ S_2 + w_3 \ S_3$, where, $S_2$ is the two-dimensional similarity, $S_3$ is the three-dimensional similarity, $w_2$ and $w_3$ are weights, S is the similarity between the target object and the at least one object in the set of objects. In an application, such as an access control face recognition application, a threshold may be set, when the value of S is greater than the threshold, it is determined that the target face belongs to the set of faces, and if the set of faces is an accessible face set, the door opens. In another application, the similarities between the target object and each object in the set of objects may be calculated, and an object with the highest similarity in the set of objects may be selected as the final recognition result, that is, the object with the highest similarity is the target object. Optionally, $w_2 \in (0.5, 1]$, $w_3 \in [0.0, 0.5)$, such as $w_2 = 0.6$, $w_3 = 0.4$.

The functions and structures of the apparatus 600 for face recognition are described in detail below. Reference may be made to the descriptions in the second method embodiment.

The target object includes a target face, the three-dimensional image of target object includes a three-dimensional face curved surface of the target face.

The three-dimensional feature of the target object includes at least one three-dimensional face feature curve of the target face.

The at least one three-dimensional face feature curve of the target face plane includes a curve where at least one plane intersects with the three-dimensional face curved surface of the target face or a curve where a part of the plane intersects with the three-dimensional face curved surface of the target face, or a set of points in the three-dimensional face curved surface of the target face with a distance to the intersecting curve less than or equal to a first threshold, or, at least one three-dimensional face feature curve of the target face includes a curve where at least one curved surface intersects with the three-dimensional face curved surface of the target face or a curve where a part of the curved surface intersects with the three-dimensional face curved surface of the target face, or a set of points in the three-dimensional face curved surface of the target face with a distance to the intersecting curve less than or equal to a first threshold. As shown in FIG. 3, the black plane is one of the at least one plane mentioned above, and the intersecting line of the plane and the face curved surface in FIG. 3 is the three-dimensional face feature curve mentioned above. Optionally, if a partial region of the three-dimensional face curved surface of the target face includes most feature information of the three-dimensional image of the target face, the part of the plane mentioned above refers to the partial plane intersecting with the partial region, that is, the part where the black plane in FIG. 3 intersects with the three-dimensional face curved surface. Similarly, if the three-dimensional face image of the target face is cut with a curved surface, the part of the curved surface mentioned above refers to the partial curved surface intersecting with the partial region. Optionally, the at least one curved surface or the part of the curved surface mentioned above may include a cylindrical surface with its center point being as same as a certain feature point or an approximate center point in the three-dimensional image, or a part of the cylindrical surface with the same center point, such as the upper half.

Optionally, the at least one plane mentioned above may be evenly distributed, for example, the included angle between two adjacent planes in the at least one plane is a first angle. Optionally, the first angle is 10 degrees. The first angle can also be other values, such as 18 degrees. The at least one plane may also be unevenly distributed according to the distribution of the feature points of the three-dimensional image of the target face, that is, the angle between the two adjacent planes in the at least one plane may be determined according to the distribution of the feature points of the three-dimensional image of the target face.

Optionally, since the original three-dimensional face curved surface obtained by a three-dimensional camera apparatus in the acquiring module 601 includes redundant regions such as the neck, the shoulder and the like, the apparatus may further include: an original three-dimensional face curved surface processing module, the original three-dimensional face curved surface processing module is configured to perform ball-cutting on the original three-dimensional face curved surface by taking the tip point of the nose on the three-dimensional face curved surface obtained by the camera apparatus as a center and by taking a first radius as a radius, and obtain the three-dimensional face curved surface mentioned above as shown in FIG. 3, the first radius may be selected according to actual sizes of the image, such as 90 mm.

Optionally, the two-dimensional feature of the target face can be acquired through a deep learning method. For example, the two-dimensional feature of a target face can be extracted using a Convolutional Neural Network (CNN) model. The convolutional neural network model can be obtained by learning millions of training samples, and adapts well in terms of change in postures of face, expressions, lighting, scales and the like within a certain range for different races and different ages.

Optionally, the three-dimensional image of the target face can be obtained by a depth camera apparatus in the acquiring module 601, such as a depth camera. The depth camera can be equipped onto various types of terminals, such as laptops, cell phones, or surveillance camera apparatus. The acquiring module 601 may include a depth camera apparatus, the depth camera apparatus may acquire the two-dimensional image and the three-dimensional image of the target object. The acquiring module 601 may also include a depth camera apparatus and a normal camera apparatus, the three-dimensional image may be acquired by the depth camera apparatus, and the two-dimensional image may be acquired by the normal camera apparatus (a non-depth camera apparatus).

Optionally, the three-dimensional feature curve mentioned above includes a three-dimensional feature band, and the feature band can be regarded as being composed of multiple feature curves. The three-dimensional feature band can be obtained by the following method: after determining a curve where the aforementioned one plane or curved surface intersects with the three-dimensional curved surface of the target object, determining a set of points in the three-dimensional curved surface of the target face with a distance to the intersecting curve less than or equal to a first threshold, the set of points is the three-dimensional feature band, the distance mentioned above may be an Euclidean distance or a Hausdorff distance or a Geodesic distance, the threshold mentioned above may be set according to the distribution of the feature points or the shape of features of the target object, for example, may be 0.3.

Optionally, taking a face as an example, it may be approximately assumed that the upper half of the face with the tip point of the nose being a boundary includes most features of the face, correspondingly, the three-dimensional face feature curve is located on the upper half of the face including the tip point of the nose. Then, the feature curve of the face is a curve segment in the upper half of the face, as shown in FIG. 4, the straight line segment in FIG. 4 is the projection of the curve segment mentioned above. Meanwhile, FIG. 4 also shows the projection of the at least one plane mentioned above, as can be known from the figure, there are 19 planes that intersect with the three-dimensional face curved surface of the target face in total, and the angles between adjacent planes are 18 degrees, consequently, there are 19 feature curves of the target face in FIG. 4.

Optionally, the at least one plane is perpendicular to a face feature plane of the target face, the face feature plane of the target face includes a plane in which three of the following feature points are located, the three points include: one point or two points of an inner corner point of a left eye, an outer corner point of the left eye, an inner corner point of a right eye, and an outer corner point of the right eye; at least one of a left corner point of a mouth, and a right corner point of the mouth; and a tip point of a nose. For example, the face feature plane of the target face may be the plane in which the inner corner point of the left eye, the left corner point of the mouth, and the right corner point of the mouth located.

Optionally, the at least one plane intersects at the first straight line, and the first straight line is perpendicular to the face feature plane of the target face and the first straight line passes the tip point of the nose on the target face. As shown in FIG. 4, the projection of the first straight line is a point at which the projections of the at least one plane intersects.

The above-mentioned method for obtaining the three-dimensional face feature curve of the target face not only commendably retains most geometric information of the face but also greatly simplifies the data amount of the recorded three-dimensional face curved surface of the target face.

Optionally, the apparatus further includes a face pose adjusting module, the face pose adjusting module is configured to perform, under a three-dimensional coordinate system whose original point is a tip point of a nose on a target face, a pose adjustment to the three-dimensional face curved surface of the target face.

The face pose adjusting module includes a first face pose adjusting module and a second face pose adjusting module; the first face pose adjusting module is configured to perform a pose adjustment according to a normal vector of the face feature plane of the target face.

The second face pose adjusting module is configured to perform a pose adjustment according to a vector which is determined according to a left corner point of a mouth and a right corner point of the mouth on the three-dimensional face curved surface of the target face.

The first face pose adjusting module is specifically configured to determine a rotation matrix $R_z$ for rotating the normal vector of the face feature plane of the target face to a direction as same as a positive direction of a Z axis in the three-dimensional coordinate system, where an included angle between the normal vector and the positive direction of the Z axis is an acute angle, rotate the three-dimensional face curved surface of the target face according to the rotation matrix $R_z$;

The second face pose adjusting module is specifically configured to determine a rotation matrix $R_x$ for rotating the vector which is determined according to the left corner point of the mouth and the right corner point of the mouth on the target face to a direction as same as a positive direction of an X axis in the three-dimensional coordinate system, where an included angle between the determined vector and the positive direction of the X axis is an acute angle, rotate the three-dimensional face curved surface of the target face according to the rotation matrix $R_x$.

Specifically, the acquiring module 601 is configured to obtain a three-dimensional face curved surface to be pose-adjusted after performing ball-cutting on the obtained original three-dimensional face curved surface by taking the tip point of the nose as the center, and taking a first radius as the radius to cut out redundant regions including the neck and the shoulder, then the face pose adjusting module performs the pose adjustment to the three-dimensional face curved surface to be pose-adjusted.

The face pose adjusting module includes a translating sub-module, the translating sub-module is configured to translate the three-dimensional face curved surface to be pose-adjusted to a three-dimensional coordinate system whose original point is the tip point of the nose. In the three-dimensional coordinate system mentioned above, the positive axis direction of the Z axis is determined according to the right-hand rule. The right-hand rule also determines the positive rotating direction of any one of the axes in the three-dimensional space. To mark the positive axis directions of the X, Y, and Z axes, place right hand back against the screen with its thumb pointing to the positive direction of the X axis. Stretch out the index finger and the middle finger, point to the positive direction of the Y axis with the index finger, and the direction indicated by the middle finger is the positive direction of the Z axis. Optionally, the selection of the original point may be the tip point of the nose, or may also be the philtrum, that is, the three-dimensional face curved surface to be pose-adjusted may also be translated to a coordinate system whose original point is the philtrum.

The face feature plane determined by the first face pose adjusting module mentioned above may be a plane in which the inner corner point of the right eye, the left corner point of the mouth and the right corner point of the mouth are located, and the included angle between the normal vector and the positive direction of the Z axis of the three-dimensional coordinate system mentioned above is an acute angle, the first face pose adjusting module calculates a rotation matrix $R_z$ for rotating the normal vector to a direction as same as the positive direction of the Z axis in the three-dimensional coordinate system, rotates the three-dimensional face curved surface of the target face according to the rotation matrix $R_z$. The second face pose adjusting module mentioned above determines the vector where the left corner point of the mouth and the right corner point of the mouth are located, where an included angle between the vector where the left corner point of the mouth and the right corner point of the mouth are located and the positive direction of the X axis of the three-dimensional coordinate system is an acute angle, calculates a rotation matrix $R_x$ for rotating the vector where the left corner point of the mouth and the right corner point of the mouth are located to a direction as same as the positive direction of the X axis in the three-dimensional coordinate system, rotates the three-dimensional face curved surface of the target face according to the rotation matrix $R_x$. Optionally, the three-dimensional face curved surface of the target face may be rotated according to the rotation matrix $R_x$ at first, and then according to the rotation matrix $R_z$.

Optionally, the rotations are performed according to the Z axis and the X axis the present invention to perform the pose adjustment. Persons of ordinary skill in the art may know that, the rotations may also be performed according to the X axis and the Y axis to perform the pose adjustment or according to the Z axis and Y axis to perform the pose adjustment, which is not limited in the present invention, and the orders of the two successive rotations are also not limited in the present invention.

The identifying module is specifically configured to determine a distance between the at least one three-dimensional face feature curve of the target face and the at least one three-dimensional face feature curve corresponding to at least one face in a set of faces, and determine a first weighted sum of the obtained at least one distance, where the first weighted sum represents a three-dimensional face similarity between the target face and at least one face in the set of faces. Specifically, after the acquiring module 601 obtains the 19 three-dimensional feature curves of the target face, obtains the 19 three-dimensional feature curves of face A in the set of faces using the same way mentioned above. The identifying module 602 calculates the distance between the three-dimensional feature curves of the target face and the three-dimensional feature curves corresponding to the face A in the set of faces respectively, 19 distance values can be obtained, and the first weighted sum of the 19 distance values is calculated. The first weighted sum represents a three-dimensional face similarity between the target face and the face A. In detail, the aforementioned corresponding means that: a feature curve A where the plane A mentioned above intersects with the three-dimensional face curved surface of the target face corresponds to a feature curve B where the same plane intersects with the face A in the set of faces. The distance between the three-dimensional face curves mentioned above is the distance between the feature curve A and the feature curve B. The distance can be an Euclidean distance, also can be a Hausdorff distance or a Geodesic distance. Obtaining the 19 distances $\varphi_i$ (i=1, 2, 3, ..., 19) corresponding to different planes using the same way, then calculating the first weighted sum $S_3 = \Sigma_{i=1}^{n} w_i \cdot \varphi_i$ of the obtained 19 distances, where, n is the number of the planes mentioned above, $w_i$ (i=1, 2, 3, ..., 19) is the weight. The $S_3$ may represent a three-dimensional face similarity between the three-dimensional face curved surface of the target face and the face A in the set of faces.

The acquiring module 601 is specifically configured to acquire a two-dimensional feature of the target face and a two-dimensional feature of at least one face in the face set using a convolutional neural network model; the identifying module 602 is specifically configured to determine a distance between two-dimensional feature of the at least one face in the set of faces and the two-dimensional feature of the target face, and determine a second weighted sum of the at least one of the distance, where the second weighted sum represents a two-dimensional face similarity between the target face and at least one face in the set of faces.

Specifically, the two-dimensional feature of the two-dimensional image of the target face and the two-dimensional feature of the two-dimensional image of face A in the set of faces can be acquired through a deep learning method, for example, using a Convolutional Neural Network (CNN) model. The convolutional neural network model can be obtained by learning training samples, and adapts well in terms of change in different postures, different lighting conditions and different scales of the target object to a certain extent. The two-dimensional similarity is denoted as $S_2$. Orders for performing the steps of calculating and obtaining the two-dimensional face similarity $S_2$ and the three-dimensional face similarity $S_3$ are not limited herein.

The identifying module is specifically configured to determine a third weighted sum of the two-dimensional face similarity of the target face and the three-dimensional face similarity of the target face, where the third weighted sum represents a similarity between the target face and at least one face in a set of faces, specifically configured to identify the target face in the set of faces according to the similarity of the at least one face. Specifically, the third weighted sum mentioned above is $S=w_2 S_2+w_3 S_3$, where, $S_2$ is the two-dimensional similarity between the target face and the face A, $S_3$ is the three-dimensional similarity between the target face and the face A, $w_2$ and $w_3$ are weights, S is the similarity between the target face and the face A. In an application, such as an access control face recognition application, a threshold may be set, when the value of S is greater than the threshold, it is determined that the target face is the face A, and if the face A belongs to an accessible set of faces, the door opens. In another application, the similarity between the target face and each face in a set of faces may be calculated, and a face with the highest similarity in the set of faces may be selected as the final recognition result, that is, the face with the highest similarity is the target face. Optionally, $w_2 \in (0.5, 1]$, $w_3 \in [0.0, 0.5)$, such as $w_2=0.6$, $w_3=0.4$.

An apparatus for pattern recognition provided in the present invention, can reduce restrictions on acquiring the image of the target object, for example, reduce the restrictions on the image of the target object in terms of postures, lighting, expressions, make-up and occlusion, thereby improving the accuracy of recognizing the target object and improving the recognition rate and reducing the recognition time at the same time.

Figure 7:
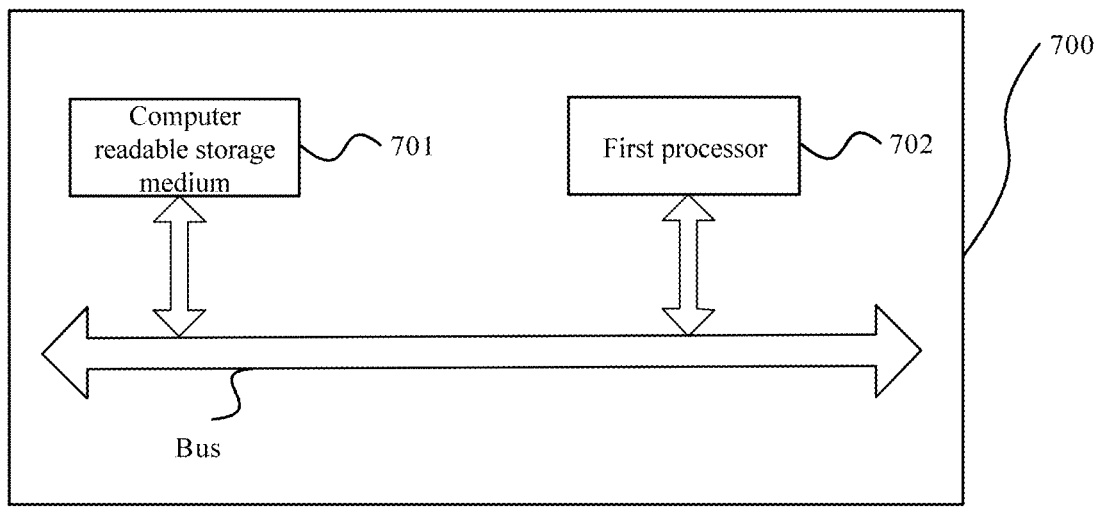
FIG. 7 is a structural diagram of another apparatus for pattern recognition according to a fourth embodiment of the present invention.

An apparatus for pattern recognition according to a fourth embodiment of the present invention will be described hereunder specifically in conjunction with FIG. 7, the apparatus includes a computer readable storage medium 701, the computer readable storage medium 701 is stored with a computer program, the computer program performs a step of the method according to the first or second embodiment when executed by a first processor 702. As shown in FIG. 7, the apparatus may include a bus.

An apparatus for pattern recognition provided in the present invention, can reduce restrictions on acquiring the image of the target object, for example, reduce the restrictions on the image of the target object in terms of postures, lighting, expressions, make-up and occlusion, thereby improving the accuracy of recognizing the target object and improving the recognition rate and reducing the recognition time at the same time.

Figure 8:
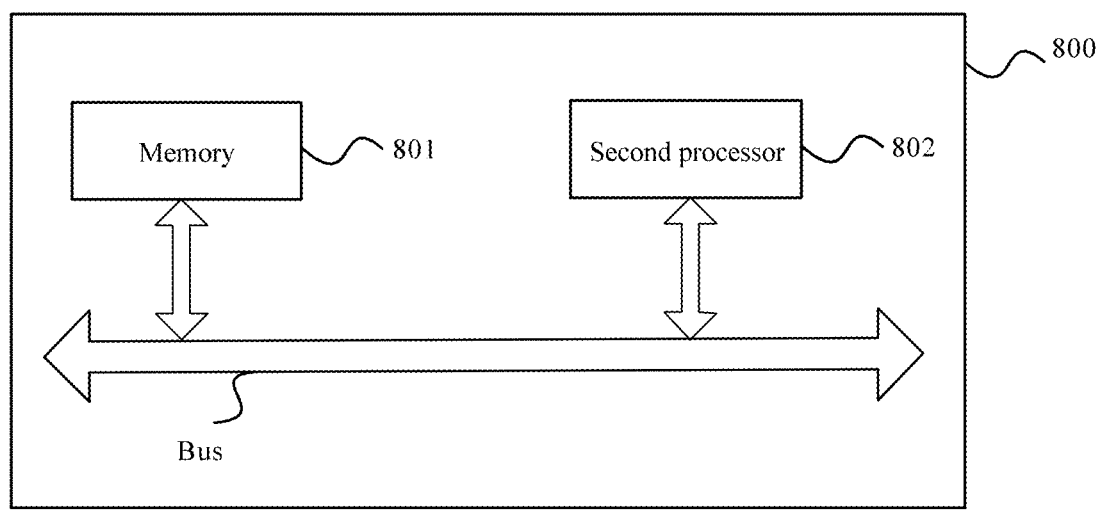
FIG. 8 is a structural diagram of a further apparatus for pattern recognition according to a fifth embodiment of the present invention.

An apparatus 800 for pattern recognition according to a fifth embodiment of the present invention will be described hereunder specifically in conjunction with FIG. 8, the apparatus includes a memory 801, a second processor 802 and a computer program stored in the memory 801 and executable on the second processor 802, where the computer program performs a step of the method according to the first or second embodiment when executed by the second processor 802. Optionally, as shown in the figure, the apparatus 800 may include a bus.

An apparatus for pattern recognition provided in the present invention, can reduce restrictions on acquiring the image of the target object, for example, reduce the restrictions on the image of the target object in terms of postures, lighting, expressions, make-up and occlusion, thereby improving the accuracy of recognizing the target object and improving the recognition rate and reducing the recognition time at the same time.

Illustratively, the computer program may be divided into one or more modules/units that are stored in the memory and executed by the processor to implement the present invention. The one or more modules/units may be a series of segments of computer program instructions capable of fulfilling a specific function, the segments of instructions are used to describe an execution process of the computer program in the apparatus/terminal device.

The apparatus/terminal device may be a calculating device such as a mobile phone, a tablet computer, a desk-top computer, a laptop, a palm computer or a cloud server. The apparatus/terminal device may include but is not limited to, a process and a memory. Those skilled in the art will appreciate that, the drawings in the present invention are merely examples of the apparatus/terminal device rather than limiting the apparatus/terminal device, which may include more or less parts than in the drawings, or a combination of certain parts, or different parts, for example, the apparatus/terminal device may also include an input output device, a network access device, a bus and the like.

The above-described processor may be a central processing unit (Central Processing Unit, CPU) or other universal processors such as a digital signal processor (Digital Signal Processor, DSP), an application specific integrated circuit (Application Specific Integrated Circuit, ASIC), a field-programmable gate array (Field-Programmable Gate Array, FPGA) or other programmable logic devices such as a discrete gate or a transistor logic device, a discrete hardware component, etc. The universal processors may be a microprocessor, or the processor may be any regular processor or the like, the processor serves as a control center of the apparatus/terminal device, and uses various interfaces and circuits to connect the parts of the entire apparatus/terminal device.

The memory may be configured to store the computer program and/or the modules. The processor implements various functions of the apparatus/terminal device by running or executing the computer program and/or the modules stored in the memory and calling data stored in the memory. The memory may include a program storage area and a data storage area, where the program storage area may store an operation system, an application program required by at least one function (for example, an image playing function), and the like; the data storage area may store data created in accordance with the use of a mobile phone (for example, video data, images), etc. Furthermore, the memory may include a high rate random access memory, a nonvolatile memory, such as a hard disk, memory, a plug-in hard disk, a smart media card (Smart Media Card, SMC), a secure digital (Secure Digital, SD) card, a flash card (Flash Card), at least one magnetic disc memory device, a flash memory device or other volatile solid memory devices.

If embodied in the form of a software function unit and sold or used as an independent product, the modules/units integrated in the apparatus/terminal device may be stored on a computer readable storage medium. Based on such understanding, the present invention implements all or a part of procedures in the method according to the foregoing embodiments, which may also be implemented by a computer program instructing relevant hardware, and the computer program may be stored on a computer readable storage medium. When the computer program is executed by the processor, the steps in the method according to the embodiments may be performed. The computer program includes computer program codes that may be in the form of source codes, object codes, executable files or in some intermediate forms. The computer readable medium may include: any entity or apparatus capable of carrying the computer program codes, a recording medium, a USB flash disk, a mobile hard disk, a magnetic disk, an optical disk, a computer memory, a read-only memory (ROM, Read-Only Memory), a random access memory (RAM, Random Access Memory), an electric carrier signal, a telecommunication signal, a software distribution medium, etc.

Imaging of a target object in each of the foregoing embodiments may be local imaging or global imaging of the target object. For either the local imaging or the global imaging the method or the apparatus provided in the present invention are applicable, or the method or the apparatus provided in the present invention are applicable to a case after corresponding adjustments are made to the local imaging or the global imaging. The described adjustments require no creative effort by persons of ordinary skill in the art, and shall fall into the protection scope of the present invention.

What is claimed is:

1. A method for pattern recognition, comprising:
   acquiring, by a processor, a two-dimensional image of a target object and acquiring, using a convolutional neural network model, a two-dimensional feature of the target object according to the two-dimensional image of the target object;
   acquiring, by a depth camera, a three-dimensional image of the target object and acquiring a three-dimensional feature of the target object according to the three-dimensional image of the target object; and
   identifying, by the processor, the target object according to the two-dimensional feature and the three-dimensional feature of the target object,
   wherein:
      the three-dimensional image of the target object comprises a three-dimensional curved surface of the target object;
      the three-dimensional feature of the target object comprises at least one three-dimensional feature curve of the three-dimensional curved surface of the target, and
      the at least one three-dimensional feature curve comprises:
         a first curve where at least one plane or a part of the at least one plane intersects the three-dimensional curved surface of the target object or a set of points in the three-dimensional curved surface of the target object with a distance to the first curve less than or equal to a threshold; or
         a second curve where at least one curved surface or a part of the at least one curved surface intersects the three-dimensional curved surface of the target object or a set of points in the three-dimensional curved surface of the target object with a distance to the second curve less than or equal to the threshold.

2. The method according to claim 1,
   wherein the three-dimensional feature of the target object is concentrated in a first region, and
   wherein the first region comprises a partial region of the three-dimensional curved surface of the target object, and the at least one three-dimensional feature curve is located in the first region.

3. The method according to claim 1, wherein:
   the at least one plane is perpendicular to a feature plane of the three-dimensional curved surface of the target object; and
   the feature plane of the three-dimensional curved surface of the target object comprises a plane in which three feature points on the three-dimensional curved surface of the target object are located.

4. The method according to claim 3, wherein:
   the at least one plane intersects with the three-dimensional curved surface of the target object at a straight line; and
   the straight line is perpendicular to the feature plane of the three-dimensional curved surface of the target object.

5. The method according to claim 3, wherein, before acquiring the three-dimensional feature of the target object according to the three-dimensional image of the target object, the method further comprises
   performing, under a three-dimensional coordinate system whose origin is a feature point on the three-dimensional curved surface of the target object, a pose adjustment to the three-dimensional curved surface of the target object,
   wherein the pose adjustment comprises at least one of the following:
      performing the pose adjustment according to a normal vector of the feature plane of the three-dimensional curved surface of the target object; and
      selecting two feature points on the three-dimensional curved surface of the target object and performing the pose adjustment according to a vector where the two feature points are located.

6. The method according to claim 5, wherein:
   the performing the pose adjustment according to a normal vector of the feature plane of the three-dimensional curved surface of the target object comprises:
      determining a rotation matrix $R_z$ for rotating the normal vector of the feature plane of the three-dimensional curved surface of the target object to a direction as same as a positive direction of a Z axis in the three-dimensional coordinate system, wherein an included angle between the normal vector and the positive direction of the Z axis is acute; and
      rotating the three-dimensional curved surface of the target object according to the rotation matrix $R_z$; and
   the performing the pose adjustment according to a vector where the two feature points are located comprises:
      determining a rotation matrix $R_x$ for rotating the vector where the two feature points are located to a direction as same as a positive direction of an X axis in the three-dimensional coordinate system, wherein an included angle between the vector where the two feature points are located and the positive direction of the X axis is acute; and
      rotating the three-dimensional curved surface of the target object according to the rotation matrix $R_x$.

7. The method according to claim 1, further comprising:
   determining a first distance between the at least one three-dimensional feature curve of the target object and at least one three-dimensional feature curve corresponding to at least one three-dimensional image in a set of three-dimensional images of objects; and
   determining a first weighted sum of the first distance, wherein the first weighted sum represents a three-dimensional image similarity between the three-dimensional image of the target object and the at least one three-dimensional image in the set of three-dimensional images of the objects.

8. The method according to claim 7, wherein:
the acquiring a two-dimensional feature of the target object according to the two-dimensional image of the target object comprises acquiring the two-dimensional feature of the two-dimensional image of the target object and a two-dimensional feature of at least one two-dimensional image in a set of two-dimensional images of the objects; and
the method further comprises:
  determining a second distance between the two-dimensional feature of the at least one two-dimensional image in the set of two-dimensional images for the objects and the two-dimensional feature of the two-dimensional image of the target object; and
  determining a second weighted sum of the second distance, wherein the second weighted sum represents a two-dimensional similarity between the two-dimensional image of the target object and the at least one two-dimensional image in the set of two-dimensional images of the objects.

9. The method according to claim 8, further comprising:
determining a third weighted sum of the two-dimensional similarity and the three-dimensional image similarity, wherein the third weighted sum represents a similarity between the target object and at least one object from the objects; and
identifying the target object in the objects according to the similarity.

10. The method according to claim 1, wherein:
the target object comprises a target face;
the three-dimensional image of target object comprises a three-dimensional face curved surface of the target face;
the three-dimensional feature of the target object comprises at least one three-dimensional face feature curve of the target face;
the at least one three-dimensional face feature curve of the target face comprises:
  a first curve where at least one plane or part of the at least one plane intersects the three-dimensional face curved surface of the target face or a set of points in the three-dimensional face curved surface of the target face with a distance to the first curve less than or equal to a threshold; or
  a second curve where at least one curved surface or a part of the at least one curved surface intersects the three-dimensional face curved surface of the target face or a set of points in the three-dimensional face curved surface of the target face with a distance to the second curve less than or equal to the threshold.

11. The method according to claim 10, wherein the three-dimensional face feature curve is located in upper half of the face comprising a tip of a nose.

12. The method according to claim 10, wherein:
the at least one plane is perpendicular to a face feature plane of the target face; and
the face feature plane of the target face comprises a plane in which three of the following feature points are located:
  one point or two points of an inner corner of a left eye, an outer corner of the left eye, an inner corner of a right eye, and an outer corner of the right eye;
  at least one of a left corner of a mouth and a right corner of the mouth; and a tip of a nose.

13. The method according to claim 12, wherein:
the at least one plane intersects the three-dimensional face curved surface of the target face at a straight line;
the straight line is perpendicular to the face feature plane of the target face; and
the straight line passes the tip of the nose on the target face.

14. The method according to claim 12,
wherein, before acquiring the three-dimensional feature of the target object according to the three-dimensional image of the target object, the method further comprises performing, under a three-dimensional coordinate system whose origin is a tip of a nose on a target face, a pose adjustment to the three-dimensional face curved surface of the target face,
wherein the pose adjustment comprises at least one of the following:
  performing the pose adjustment according to a normal vector of the face feature plane of the target face; and
  performing the pose adjustment according to a vector which is determined according to the left corner of the mouth and the right corner point of the mouth on the three-dimensional face curved surface of the target face.

15. The method according to claim 14, wherein:
the performing the pose adjustment according to a normal vector of the face feature plane of the target face comprises:
  determining a rotation matrix $R_z$ for rotating the normal vector of the face feature plane of the target face to a direction as same as a positive direction of a Z axis in the three-dimensional coordinate system, wherein an included angle between the normal vector and the positive direction of the Z axis is acute; and
  rotating the three-dimensional face curved surface of the target face according to the rotation matrix $R_z$; and
the performing the pose adjustment according to a vector which is determined according to the left corner point of the mouth and the right corner point of the mouth on the target face comprises:
  determining a rotation matrix $R_x$ for rotating the vector which is determined according to the left corner point of the mouth and the right corner point of the mouth on the target face to a direction as same as a positive direction of an X axis in the three-dimensional coordinate system, wherein an included angle between the determined vector and the positive direction of the X axis is acute; and
  rotating the three-dimensional face curved surface of the target face according to the rotation matrix $R_x$.

16. The method according to claim 10, further comprising:
determining a first distance between the at least one three-dimensional face feature curve of the target face and the at least one three-dimensional face feature curve corresponding to at least one face in a set of faces; and
determining a first weighted sum of the first distance, wherein the first weighted sum represents a three-dimensional face similarity between the target face and the at least one face in the set of the faces.

17. The method according to claim 16, wherein:
the acquiring the two-dimensional feature of the target object according to the two-dimensional image of the target object comprises acquiring a two-dimensional feature of the target face and a two-dimensional feature of at least one face in the faces using the convolutional neural network model;

the method further comprises:
- determining a second distance between the two-dimensional feature of the at least one face in the set of faces and the two-dimensional feature of the target face; and
- determining a second weighted sum of the second distance, wherein the second weighted sum represents a two-dimensional face similarity between the target face and at least one face in the set of faces.

18. The method according to claim 17, further comprising:
- determining a third weighted sum of the two-dimensional face similarity of the target face and the three-dimensional face similarity of the target face, wherein the third weighted sum represents a similarity between the target face and at least one face in a set of faces;
- identifying the target face in the set of faces according to the similarity of the at least one face.

19. The method according to claim 6, wherein the included angle is 10 degrees.

20. An apparatus for pattern recognition, comprising an acquiring module and an identifying module,
wherein the acquiring module acquires a two-dimensional image of a target object using a convolutional neural network model, acquires a two-dimensional feature of the target object according to the two-dimensional image of the target object, acquires a three-dimensional image of the target object by a depth camera, and acquires a three-dimensional feature of the target object according to the three-dimensional image of the target object;

wherein the identifying module identifies the target object according to the two-dimensional feature and the three-dimensional feature of the target object obtained by the acquiring module, and wherein:
- the three-dimensional image of the target object comprises a three-dimensional curved surface of the target object;
- the three-dimensional feature of the target object comprises at least one three-dimensional feature curve of the three-dimensional curved surface of the target object, and
- the at least one three-dimensional feature curve comprises:
  - a first curve where at least one plane or a part of the at least one plane intersects the three-dimensional curved surface of the target object or a set of points in the three-dimensional curved surface of the target object with a distance to the first curve less than or equal to a threshold; or
  - a second curve where at least one curved surface or a part of the at least one curved surface intersects the three-dimensional curved surface of the target object or a set of points in the three-dimensional curved surface of the target object with a distance to the second curve less than or equal to the threshold.

21. A non-transitory computer readable storage medium that is stored with a computer program, wherein the computer program performs the method according to claim 1 when executed by the processor.

22. An apparatus for pattern recognition, comprising a memory, the processor of claim 1, and a computer program stored in the memory and executable on the processor, wherein the computer program performs the method according to claim 1 when executed by the processor.

* * * * *